United States Patent
Paladugu et al.

(10) Patent No.: US 12,402,183 B2
(45) Date of Patent: Aug. 26, 2025

(54) TECHNIQUES FOR SUPPORTING CONNECTIVITY OF REMOTE USER EQUIPMENTS WITH RELAY ACCESS VIA AN INTERWORKING FUNCTION

(71) Applicant: QUALCOMM Incorporated, San Diego, CA (US)

(72) Inventors: Karthika Paladugu, San Diego, CA (US); Hong Cheng, Basking Ridge, NJ (US); Gavin Bernard Horn, La Jolla, CA (US); Haris Zisimopoulos, London (GB); Stefano Faccin, San Ysidro, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 17/782,086

(22) PCT Filed: Dec. 30, 2020

(86) PCT No.: PCT/US2020/067592
§ 371 (c)(1),
(2) Date: Jun. 2, 2022

(87) PCT Pub. No.: WO2021/138511
PCT Pub. Date: Jul. 8, 2021

(65) Prior Publication Data
US 2023/0007709 A1 Jan. 5, 2023

(30) Foreign Application Priority Data
Jan. 3, 2020 (GR) .............................. 20200100002

(51) Int. Cl.
*H04W 76/00* (2018.01)
*H04W 76/14* (2018.01)
*H04W 88/04* (2009.01)

(52) U.S. Cl.
CPC ............ *H04W 76/14* (2018.02); *H04W 88/04* (2013.01)

(58) Field of Classification Search
CPC ...................................................... H04W 76/14
See application file for complete search history.

(56) References Cited

U.S. PATENT DOCUMENTS 12,108,494 B2 * 10/2024 Paladugu .............. H04W 76/14
2019/0174449 A1 6/2019 Shan et al.
(Continued)

FOREIGN PATENT DOCUMENTS

| CN | 109997334 A | 7/2019 |
|---|---|---|
| WO | 2019121497 A1 | 6/2019 |
| WO | 2021045859 A1 | 3/2021 |

OTHER PUBLICATIONS

Qualcomm Incorporated: "N3IWF selection for Layer-3 UE-to-Network Relay", 3GPP Draft; S2-2005831, 3rd Generation Partnership Project (3GPP), Mobile Competence Centre ; 650, Route Des Lucioles ; F-06921 Sophia-Antipolis Cedex; France 9 vol. SA WG2, No. Elbonia ;Aug. 19, 2020-Sep. 1, 2020 Aug. 13, 2020 (Aug. 13, 2020).

(Continued)

*Primary Examiner* — Erika A Washington
(74) *Attorney, Agent, or Firm* — ArentFox Schiff LLP

(57) ABSTRACT

The present disclosure relates to wireless communications, and more particularly to providing connectivity of a PC5 remote user equipment (UE) with UE-to-network (NW) relay access to the 5G core (5GC) via an IWF (e.g., N3IWF). In one aspect, a remote UE may be provided support for a network access stratum (NAS) connection with 5GC via an IWF. In another aspect, Access Traffic Steering, Switching and Splitting (ATSSS) support may be provided for a remote UE.

24 Claims, 23 Drawing Sheets

(56) References Cited

U.S. PATENT DOCUMENTS

2020/0053802 A1 2/2020 Li et al.
2024/0224355 A1* 7/2024 Lei .................... H04W 12/0433

OTHER PUBLICATIONS

Qualcomm Incorporated: "Solution to support end-to-end security for Layer-3 UE-to-Network Relay", 3GPP Draft; S2-2000575, 3rd Generation Partnership Project (3GPP), Mobile Competence Centre ; 650, Route Des Lucioles ; F-06921 Sophia-Antipolis Cedex ; France vol. SA WG2, No. Incheon, Korea; Jan. 13, 2020-Jan. 17, 2020 Jan. 7, 2020 (Jan. 7, 2020).

Intel: "Solution of 5GC Capable UE behind 5G-RG connected to 5GC via NG-RAN/W-5GAN", 3GPP Draft; S2-1810426-5WWC-5G-RG-RELAYUE-V3, 3rd Generation Partnership Project (3GPP), Mobile Competence Centre ; 650, Route Des Lucioles ; F-06921 Sophia-Antipolis Cedex; France vol. SA WG2, No. Dongguan, China; Oct. 15, 2018-Oct. 19, 2018 Oct. 9, 2018 (Oct. 9, 2018), pp. 1-9.

3rd Generation Partnership Project; Technical Specification Group Services and System Aspects; Study on system enhancement for Proximity based Services (ProSe) in the 5G System (5GS) (Release 17), 3GPP Standard; Technical Report; 3GPP TR 23.752, 3rd Generation Partnership Project (3GPP), Mobile Competence Centre ; 650, Route Des Lucioles ; F-06921 Sophia-Antipolis Cedex ; France vol. SA WG2, No. V0.2.0 Dec. 6, 2019 (Dec. 6, 2019), pp. 1-34.

3rd Generation Partnership Project; Technical Specification Group Services and System Aspects; System architecture for the 5G System (5GS); Stage 2 (Release 16), 3GPP Standard; Technical Specification; 3GPP TS 23.501, 3rd Generation Partnership Project (3GPP), Mobile Competence Centre ; 650, Route Des Lucioles ; F-06921 Sophia-Antipolis Cedex ; France vol. SA WG2, No. V16.3.0 Dec. 22, 2019 (Dec. 22, 2019), pp. 1-417.

3rd Generation Partnership Project; Technical Specification Group Services and System Aspects; Proximity-based services (ProSe); Stage 2 (Release 15), 3GPP Standard; Technical Specification; 3GPP TS 23.303, 3rd Generation Partnership Project (3GPP), Mobile Competence Centre ; 650, Route Des Lucioles ; F-06921 Sophia-Antipolis Cedex ; France, No. V15.1.0 Jun. 30, 2018 (Jun. 30, 2018), pp. 1-130.

International Search Report and Written Opinion issued in corresponding International Application No. PCT/US2020/067592 dated Apr. 22, 2021.

3rd Generation Partnership Project; Technical Specification Group Services and System Aspects; Procedures for the 5G System (5GS); Stage 2 (Release 16), 3GPP Standard, Technical Specification, 3GPP TS 23.502, 3rd Generation Partnership Project, Mobile Competence Centre, 650, Route Des Lucioles, F-06921 Sophia-Antipolis Cedex, France, vol. SA WG2, No. V16.3.0, Dec. 22, 2019, pp. 1-558, XP051840932.

Intel: "Solution of 5GC Capable UE Behind 5G-RG Connected to 5GC via NG-RAN/W-5GAN", SA WG2 Meeting #S2-128Bis, S2-188141, Aug. 20-24, 2018, Sophia Antipolis, France, Aug. 14, 2018, pp. 1-7, Section 2.

Intel: "Solution of 5GC Capable UE Behind 5G-RG Connected to 5GC Via NG-RAN/W- 5GAN", 3GPP Draft, SA WG2 Meeting SA2#129, S2-1810426-5WWC- 5G-RG-RELAYUE-V3, (revision of S2-18xxxx), Dongguan, China, Oct. 15, 2018-Oct. 19, 2018, Oct. 9, 2018, XP051539407, pp. 1-9.

* cited by examiner

TECHNIQUES FOR SUPPORTING CONNECTIVITY OF REMOTE USER EQUIPMENTS WITH RELAY ACCESS VIA AN INTERWORKING FUNCTION

CROSS REFERENCE TO RELATED APPLICATION(S)

This application is a 35 U.S.C. § 371 National Phase of PCT Application No. PCT/US2020/067592, filed Dec. 30, 2020, which claims the benefit of Greek Patent Application Number 20200100002, entitled "TECHNIQUES FOR SUPPORTING CONNECTIVITY OF REMOTE USER EQUIPMENTS WITH RELAY ACCESS VIA AN INTERWORKING FUNCTION" and filed on Jan. 3, 2020, which is expressly incorporated by reference herein in its entirety.

BACKGROUND

Aspects of the present disclosure relate generally to wireless communication systems, and more particularly, to configuring connectivity of a PC5 remote user equipment (UE) with UE-to-network (NW) relay access to a 5G core via a Interworking Function (IWF).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, UE-to-NW relaying in NR implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a remote user equipment (UE) is provided. The method may include discovering an Interworking Function (IWF) while connected to a relay UE over a sidelink interface. The method may further include establishing a non-access stratum (NAS) connection with a network entity via the IWF. The method may further include communicating, with the network entity via the IWF.

A further example implementation includes an apparatus for wireless communications comprising a memory and at least one processor in communication with the memory. The at least one processor may be configured to discover an IWF while connected to a relay UE over a sidelink interface. The at least one processor may be configured to establish a NAS connection with a network entity via the IWF. The at least one processor may be configured to communicate, with the network entity via the relay UE and via the IWF.

An additional example implementation includes an apparatus for wireless communications. The apparatus may include means for discovering an IWF while connected to a relay UE over a sidelink interface. The apparatus may further include means for establishing a NAS connection with a network entity via the IWF. The apparatus may further include means for communicating, with the network entity via the relay UE and via the IWF.

A further example implementation includes computer-readable medium storing computer code executable by a processor for wireless communications at a network entity comprising code for discovering an IWF while connected to a relay UE over a sidelink interface, establishing a NAS connection with a network entity via the IWF, and communicating, with the network entity via the relay UE and via the IWF.

According to another example, a method of wireless communication at a relay UE is provided. The method may include receiving at least one relay discovery parameter from a network entity. The method may further include determining, based at least on the at least one relay discovery parameter from a remote UE, at least one parameter for establishing one or more packet data unit (PDU) sessions towards an IWF, while connected to the remote UE over a sidelink interface. The method may further include establishing, for the remote UE, a single relay PDU session or multiple relay PDU sessions.

A further example implementation includes an apparatus for wireless communications comprising a memory and at least one processor in communication with the memory. The at least one processor may be configured to receive at least one relay discovery parameter from a network entity. The at least one processor may be configured to determine, based at least on the at least one relay discovery parameter from a remote UE, at least one parameter for establishing one or more PDU sessions towards an IWF, while connected to the remote UE over a sidelink interface. The at least one processor may be configured to establish, for the remote UE, a single relay PDU session or multiple relay PDU sessions.

An additional example implementation includes an apparatus for wireless communications. The apparatus may include means for receiving at least one relay discovery parameter from a network entity. The apparatus may further include means for determining, based at least on the at least one relay discovery parameter from a remote UE, at least one parameter for establishing one or more PDU sessions towards an IWF, while connected to the remote UE over a sidelink interface. The apparatus may further include means for establishing, for the remote UE, a single relay PDU session or multiple relay PDU sessions.

A further example implementation includes computer-readable medium storing computer code executable by a processor for wireless communications at a network entity comprising code for receiving at least one relay discovery parameter from a network entity, determining, based at least on the at least one relay discovery parameter from a remote UE, at least one parameter for establishing one or more PDU sessions towards an IWF, while connected to the remote UE over a sidelink interface, and establishing, for the remote UE, a single relay PDU session or multiple relay PDU sessions.

According to yet another example, a method of wireless communication at a node is provided. The method may include determining satisfaction of a service continuity condition over a radio interface or a sidelink interface while connected to a network entity via a relay UE. The method may further include establishing a multi-access packet data unit (MA-PDU) session via at least one of the radio interface or an IWF. The method may further include communicating, with the network entity via the relay UE, data via the radio interface or the IWF.

A further example implementation includes an apparatus for wireless communications comprising a memory and at least one processor in communication with the memory. The at least one processor may be configured to determine satisfaction of a service continuity condition over a radio interface or a sidelink interface while connected to a network entity via a relay UE. The at least one processor may be configured to establish an MA-PDU session via at least one of the radio interface or an IWF. The at least one processor may be configured to communicate, with the network entity via the relay UE, data via the radio interface or the IWF.

An additional example implementation includes an apparatus for wireless communications. The apparatus may include means for determining satisfaction of a service continuity condition over a radio interface or a sidelink interface while connected to a network entity via a relay UE. The apparatus may further include means for establishing an MA-PDU session via at least one of the radio interface or an IWF. The apparatus may further include means for communicating, with the network entity via the relay UE, data via the radio interface or the IWF.

A further example implementation includes computer-readable medium storing computer code executable by a processor for wireless communications at a network entity comprising code for determining satisfaction of a service continuity condition over a radio interface or a sidelink interface while connected to a network entity via a relay UE, establishing a MA-PDU session via at least one of the radio interface or an IWF, and communicating, with the network entity via the relay UE, data via the radio interface or the IWF.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure relates to wireless communications, and more particularly to providing connectivity of a PC5 remote user equipment (UE) with UE-to-network (NW) relay access to the 5G Core (5GC) via an Interworking Function (IWF) (e.g., Non-3GPP IWF). Specifically, L3 UE-to-NW relaying may be implemented to support relaying for a remote UE as part of a system enhancement for Proximity based Services (ProSe) in a 5G System (5GS). In such system, the ProSe 5G UE-to-NW relay UE may provide functionality to support connectivity to the network for remote UEs by relaying the remote UEs user plane (UP) traffic to a gNB/5GC.

Figure 1:
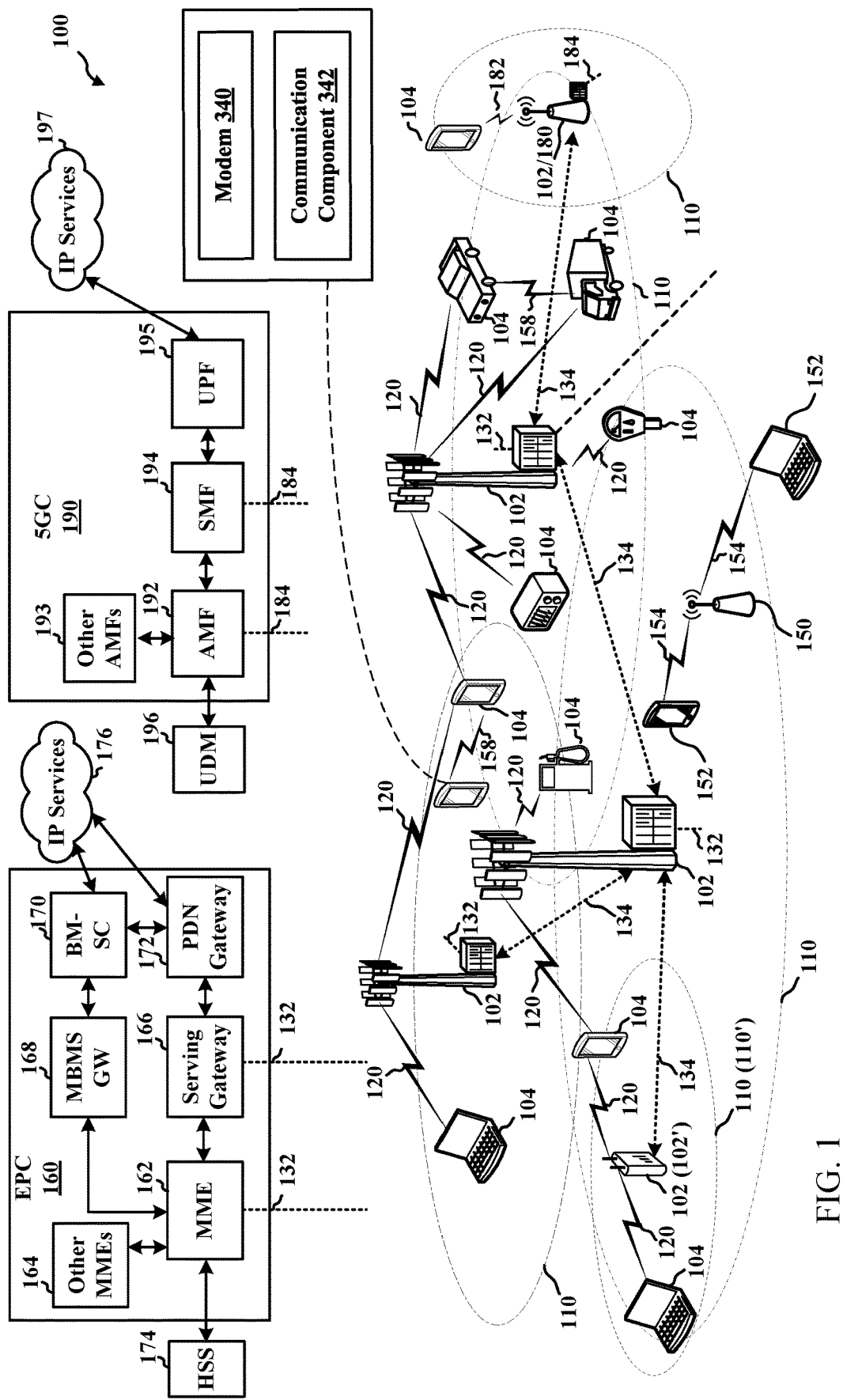
FIG. 1 illustrates an example of a wireless communication system, in accordance with various aspects of the present disclosure.

However, there may be a number of drawbacks of the L3 UE-to-NW relay scheme. For example, a network access stratum (NAS) connection may not exist for the remote UE with the 5GC over PC5 UE-to-NW relay path, e.g., no authorization and authentication of the remote UE by 5GC. Further, for instance, end-to-end security may not exist for remote UE data, only hop-by-hop (e.g., PC5 and Uu) security supported. Additionally, a remote UE Internet Protocol (IP) session continuity may not exist when a data path switches between a radio interface (e.g., Uu) link and a relay link. In particular, a remote UE may have multiple paths available, such as a Uu path (in-coverage of gNB) or a UE-to-NW relay path via PC5 or multiple UE-to-NW relay paths (e.g., as shown in FIG. 1). In such cases, the UE may switch from one path to another path exhibiting better radio conditions to support service continuity.

As such, to overcome the aforementioned drawbacks, it may be desirable to provide connectivity of a PC5 remote UE with UE-to-NW relay access to the 5GC via an IWF (e.g., N3IWF). In one implementation, a remote UE may configure a NAS connection with 5GC via an N3IWF. The UE-to-NW relay over PC5 may be another access type connected to the N3IWF. In another aspect, Access Traffic Steering, Switching and Splitting (ATSSS) may be implemented at a remote UE. For instance, the remote UE NAS may message for ATSSS support carried via N3IWF to the 5GC.

In one implementation, a remote UE may discover an IWF while connected to a relay UE over a sidelink interface. The remote UE may further establish a non-access stratum (NAS) connection with a network entity using the signaling IPsec security association established (via the Internet Key Exchange (IKE) security association (SA) procedures) with the IWF, similar to untrusted non-3GPP Access via N3IWF. The remote UE may further communicate, with the network entity via the relay UE, by sending the data over the IPsec Child SAs established with the IWF for the corresponding PDU Sessions.

In another implementation, a relay UE may receive at least one relay discovery parameter from a network entity. The relay UE may further determine, based at least on the at least one relay discovery parameter from a remote UE, at least one parameter for establishing one or more PDU sessions towards an IWF, while connected to the remote UE over a sidelink interface. The relay UE may further establish, for the remote UE, a single relay PDU session or multiple relay PDU sessions.

In another implementation, a remote UE may determine satisfaction of a service continuity condition over a radio interface or a sidelink interface while connected to a network entity via a relay UE. The remote UE may further establish a multi-access packet data unit (MA-PDU) session via at least one of the radio interface or an IWF. The remote UE may further communicate, with the network entity via the relay UE, data via the radio interface or the IWF.

The described features will be presented in more detail below with reference to FIGS. 1-23

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as UE 104 of the wireless communication system may have a modem 340 and communicating component 342 for providing connectivity of a PC5 remote UE with UE-to-NW relay access to the 5GC via an IWF (e.g., N3IWF), as described herein. In another example, some nodes, such as base station 102/gNB 180, may have a modem 240 and communicating component 242 for facilitating communication with one or more UEs 104. Though a UE 104 is shown as having the modem 340 and communicating component 342 and a base station 102/gNB 180 is shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). Alternatively, or in addition, the base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
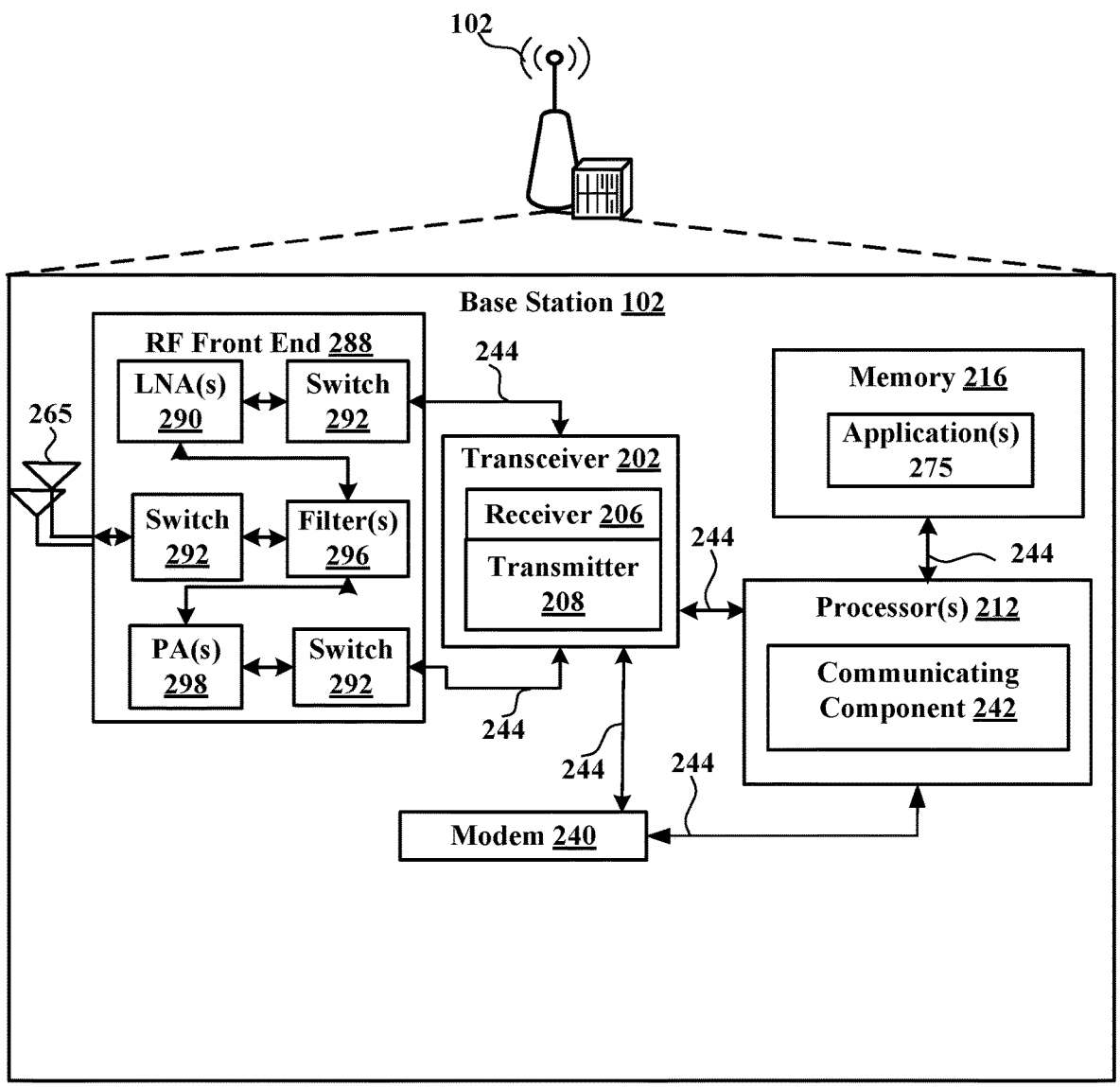
FIG. 2 is a block diagram illustrating an example of a network entity (also referred to as a base station), in accordance with various aspects of the present disclosure.
Figure 3:
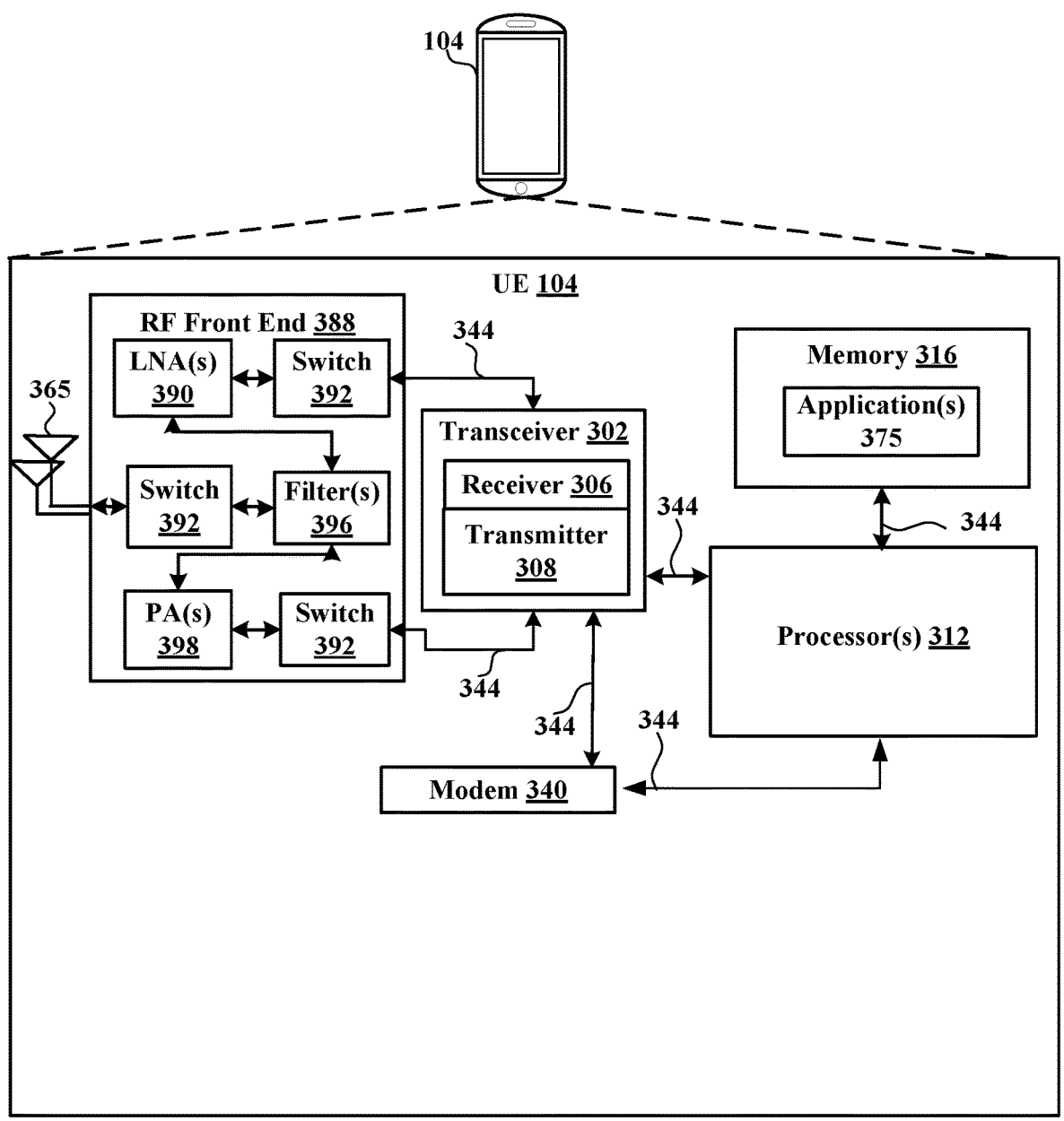
FIG. 3 is a block diagram illustrating an example of a user equipment (UE), in accordance with various aspects of the present disclosure.
Figure 4:
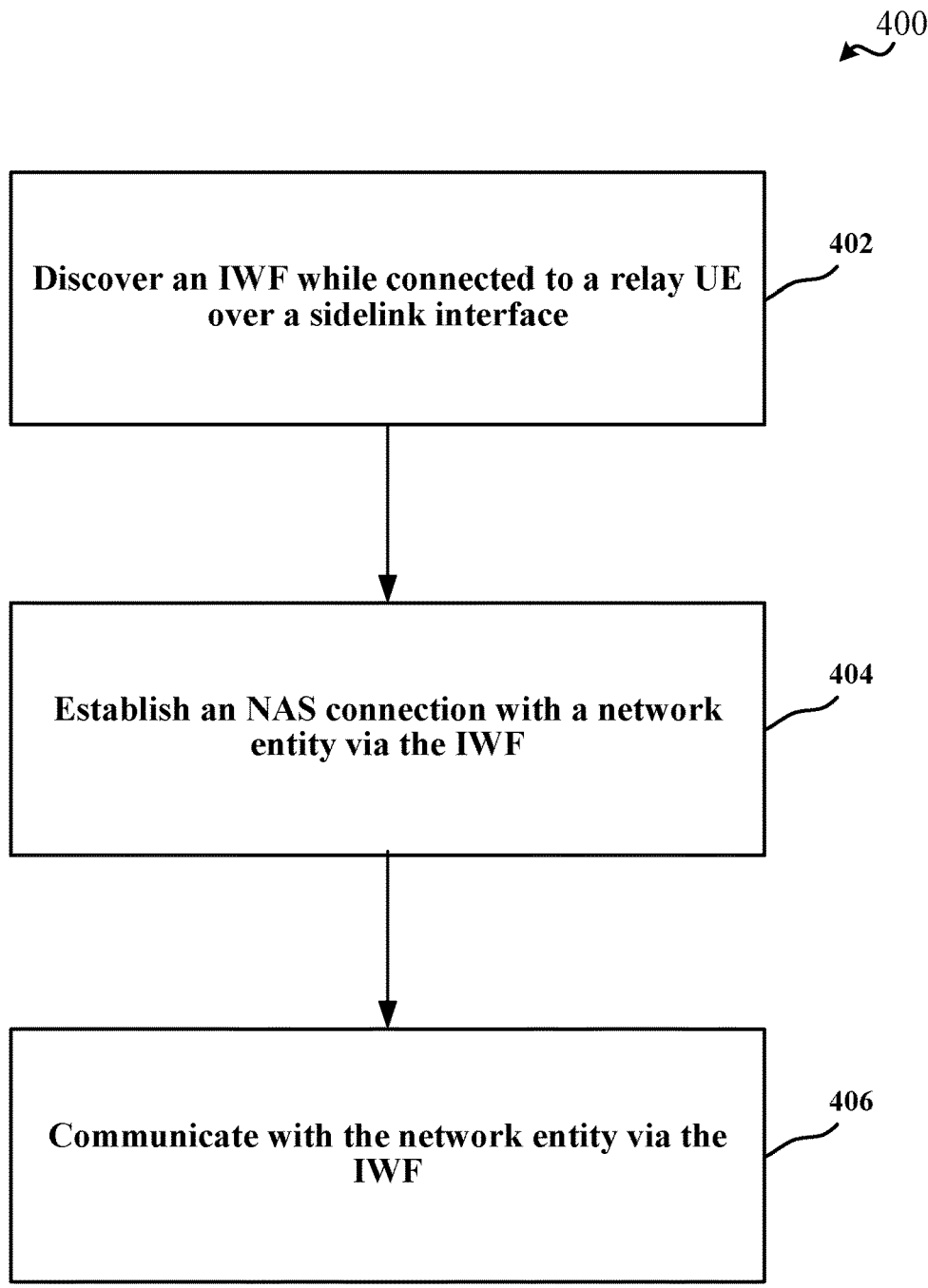
FIG. 4 is a flow chart illustrating an example of a method for wireless communications at a remote UE, in accordance with various aspects of the present disclosure, e.g., remote UE non-access stratum (NAS) connection with 5G core (5GC) via Interworking Function (IWF)
Figure 5:
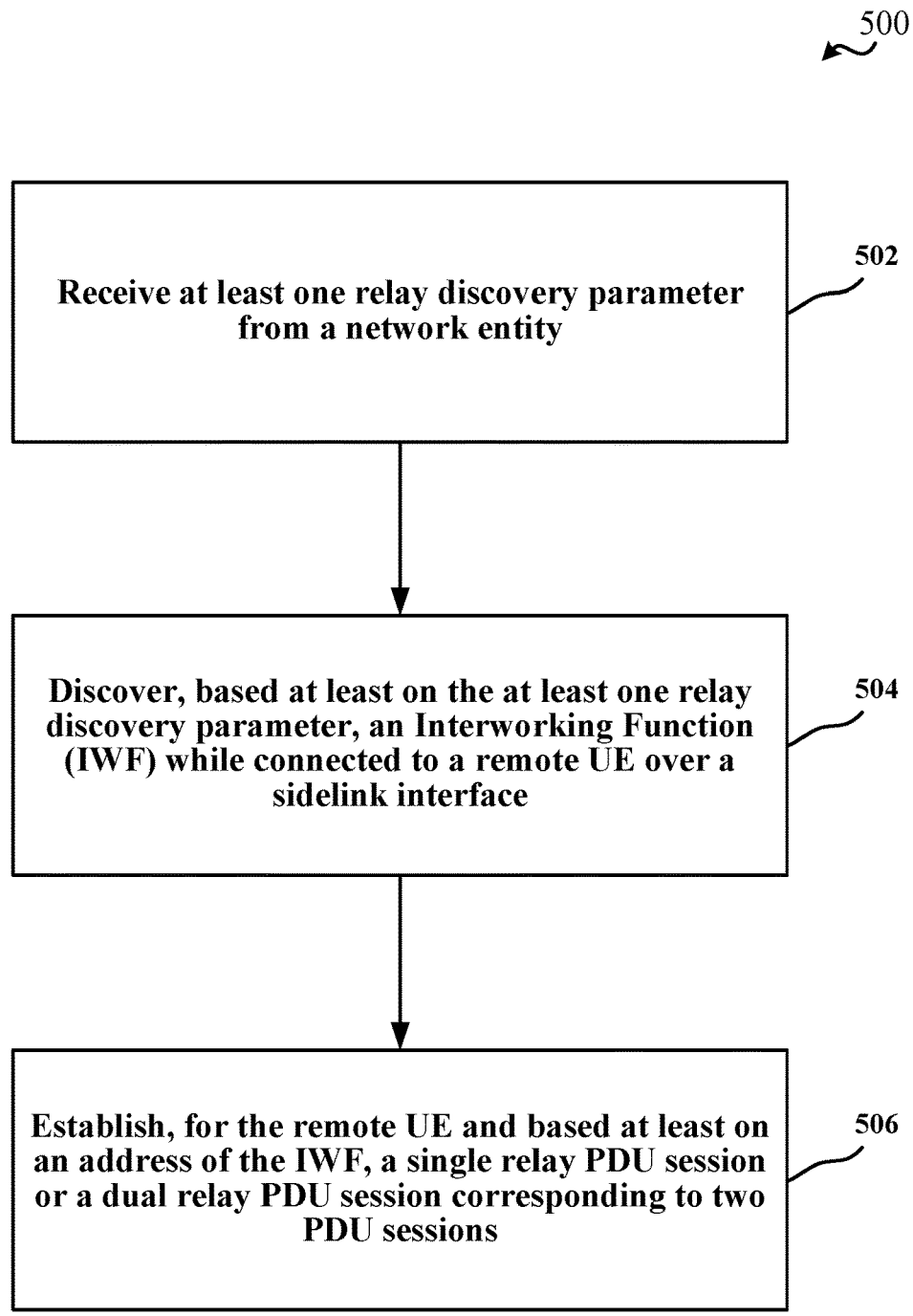
FIG. 5 is a flow chart illustrating an example of a method for wireless communications at a relay UE, in accordance with various aspects of the present disclosure, e.g., relay UE non-access stratum (NAS) connection with 5G core (5GC) via Interworking Function (IWF)
Figure 6:
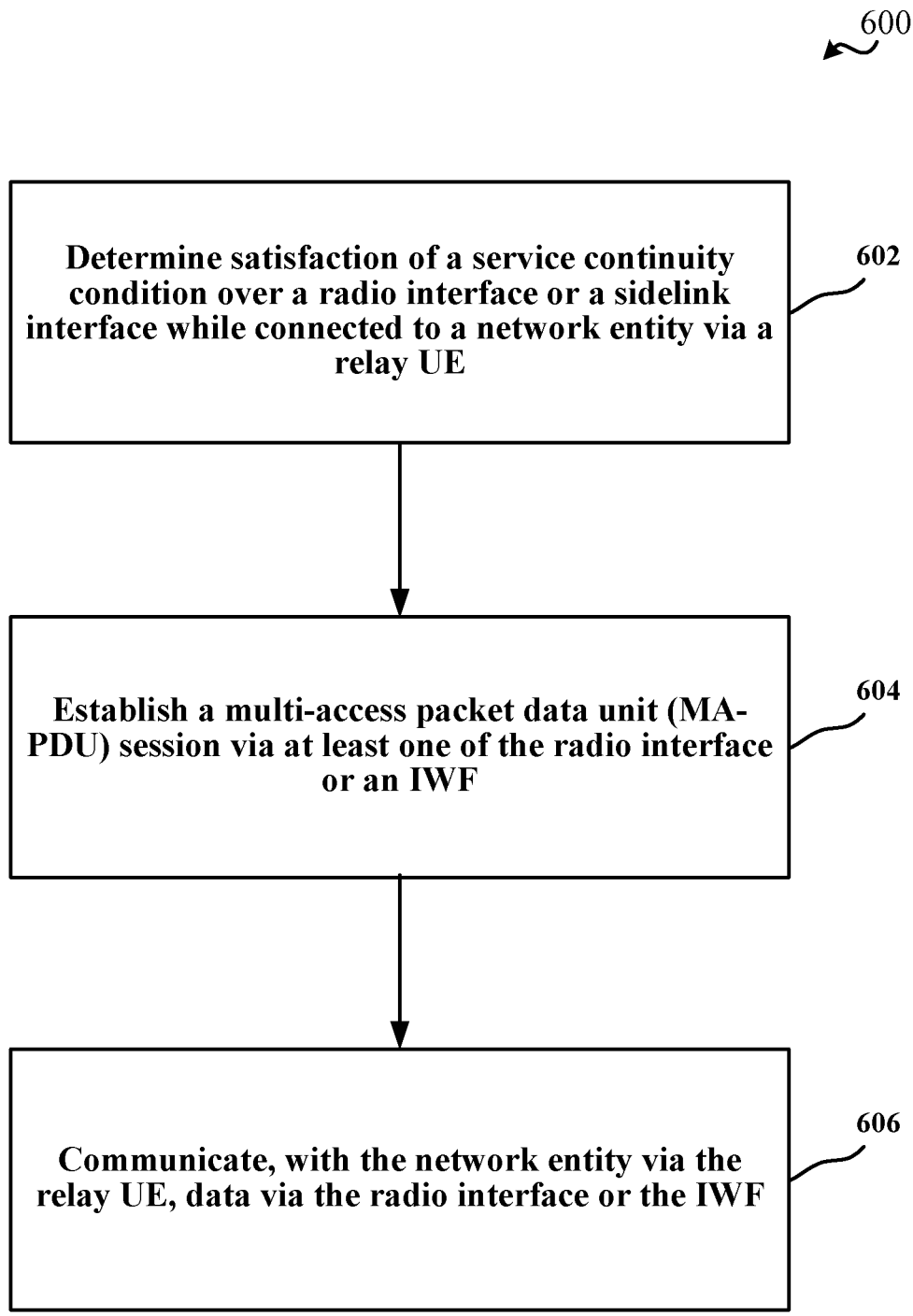
FIG. 6 is a flow chart illustrating an example of a method for wireless communications at a remote UE, in accordance with various aspects of the present disclosure, e.g., Access Traffic Steering, Switching and Splitting (ATSSS) at a remote UE.

Turning now to FIGS. 2-6, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of a node such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 including RACH component 244 for facilitating communication with a UE such as UE 104.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the base station in FIG. 16. Similarly, the memory 216 may correspond to the memory described in connection with the base station in FIG. 16.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or communication component 342 including RACH component 244 for providing connectivity of a PC5 remote UE with UE-to-NW relay access to the 5GC via an IWF (e.g., N3IWF).

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the UE in FIG. 16. Similarly, the memory 316 may correspond to the memory described in connection with the UE in FIG. 16.

Turning now to FIGS. 4-6, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by reference to one or more components of FIGS. 2, 3 and/or 16, as described herein, a specially-programmed processor, a processor executing specially-programmed software or computer-readable media, or by any other combination of a hardware component and/or a software component capable of performing the described actions or functions.

FIG. 4 illustrates a flow chart of an example of a method 400 for wireless communication at a remote UE for NAS connection with a 5GC via the N3IWF. In an example, a UE 104 can perform the functions described in method 400 using one or more of the components described in FIGS. 1, 3, and 16. Additionally, method 400 may be performed using the architecture shown in FIG. 8, and correspondingly described herein. The control plane protocol stack shown in FIG. 9, and described herein, may be used as part of method 400. Similarly, the user plane stack shown in FIG. 10, and described herein, may be used as part of method 400. The method 400 may also include any one or more features from the flow of FIG. 11.

At block 402, the method 400 may include discovering an IWF while connected to a relay UE over a sidelink interface. In an aspect, the communication component 342, e.g., in conjunction with processor(s) 312, memory 316, and/or transceiver 302, may be configured to discover an IWF while connected to a relay UE over a sidelink interface. Thus, the UE 104, the processor(s) 312, the communication component 342 or one of its subcomponents may define the means for discovering an IWF while connected to a relay UE over a sidelink interface. For example, the remote UE may identify an IWF of a network via the PC5 connection with the relay UE, which in turn is connected to the network via Uu.

At block 404, the method 400 may include establishing a NAS connection with a network entity via the IWF. In an aspect, the communication component 342, e.g., in conjunction with processor(s) 312, memory 316, and/or transceiver 302, may be configured to establish a NAS connection with a network entity via the IWF. For example, the communication component 342 may establish a NAS connection with a network entity via the IWF, as described above in more detail. Thus, the UE 104, the processor(s) 312, the communication component 342 or one of its subcomponents may define the means for establishing a NAS connection with a network entity via the IWF. For example, the remote UE may send NAS signaling to the IWF IP address to establish the NAS connection with the network entity.

In some aspects, establishing the NAS connection may include performing 5GS registration and connection management with the 5GC over UE-to-NW relay access.

In some aspects, establishing the NAS connection includes establishing an extensible authentication protocol (EAP)-5G session using an EAP-5G protocol with the IWF.

In some aspects, establishing the NAS connection may be further based on an Extensible Access Protocol for 5G (EAP-5G) protocol and an Internet Key Exchange (IKE) protocol.

In some aspects, establishing the NAS connection may include establishing an Internet Protocol Security (IPsec) tunnel with the IWF using the IKE procedures over the relay UE access.

In some aspects, establishing the NAS connection may include establishing an EAP-5G session with the 5GC to support sending NAS messages encapsulated within EAP-5G packets.

In some aspects, establishing the NAS connection may further include transmitting PDU session management information associated with a PDU session to the network entity over the IPsec tunnel established with N3IWF to establish a PDU session.

In some aspects, transmitting the PDU session management information may include transmitting a PDU session request type field to indicate that the PDU session is for transmitting data via the relay UE access.

In some aspects, establishing the NAS connection may further include initiating an Internet Key Exchange (IKE) procedure for establishment of the IPSec tunnel with the IWF, and initiating at last one NAS procedure over the IPSec tunnel when connected to the relay UE with support for the one or more relay service codes.

At block 406, the method 400 may include communicating, with the network entity, via the relay UE and via the IWF. In an aspect, the communication component 342 including, e.g., in conjunction with processor(s) 312, memory 316, and/or transceiver 302, may be configured to communicate, with the network entity, via the relay UE and via the IWF. Thus, the UE 104, the processor(s) 312, the communication component 342 or one of its subcomponents may define the means for communicating, with the network entity, via the relay UE and via the IWF. For example, to provide a NAS connection for the remote UE with the 5GC over a PC5 UE-to-NW relay path, as well as end-to-end security for remote UE data, the remote UE may communicate, via radio components, with the network entity via the IWF.

In some aspects, communicating data with the network entity may include communicating data for the PDU session with the network entity or a different network entity over the sidelink interface and via the child IPSec tunnel to the IWF.

In some aspects, method 400 may optionally include transmitting a capability indication representing support for a connection to the network entity via the IWF in a registration message via a radio interface. In an aspect, the communication component 342 including, e.g., in conjunction with processor(s) 312, memory 316, and/or transceiver 302, may be configured to transmit a capability indication representing support for a connection to the network entity via the IWF in a registration message via a radio interface. Thus, the UE 104, the processor(s) 312, the communication component 342 or one of its subcomponents may define the means for transmitting a capability indication representing support for a connection to the network entity via the IWF in a registration message via a radio interface. For instance, the remote UE may transmit, via radio components, a message indicating capability for NAS connection via the IWF to the network entity via the relay UE.

In some aspects, method 400 may optionally include receiving, based on transmitting the capability indication, provisioning information including at least one ProSe parameter from the network entity (i.e., AMF). In an aspect, the communication component 342 including, e.g., in conjunction with processor(s) 312, memory 316, and/or transceiver 302, may be configured to receive, based on transmitting the capability indication, provisioning information including at least one ProSe parameter from the network entity. Thus, the UE 104, the processor(s) 312, the communication component 342 or one of its subcomponents may define the means for receiving, based on transmitting the capability indication, provisioning information including at least one ProSe parameter from the network entity. For example, the remote UE may be provisioned with the policy/parameters for ProSe communications by the AMF by a ProSe parameter.

In some aspects, method 400 may optionally include receiving, from the network entity via the relay UE, one or more relay service codes for relay access via N3IWF. In an aspect, the communication component 342 including, e.g., in conjunction with processor(s) 312, memory 316, and/or transceiver 302, may be configured to receive, from the network entity via the relay UE, one or more relay service codes for relay access via N3IWF. Thus, the UE 104, the processor(s) 312, the communication component 342 or one of its subcomponents may define the means for receiving, from the network entity via the relay UE, one or more relay service codes for relay access via N3IWF. For example, the remote UE may use a relay service code to identify a connectivity service the ProSe relay UE provides. The remote UE may engage in PC5 communication with the relay UE via a PC5 interface via a relay service code.

In some aspects, the network entity may correspond to a 5GC entity and the sidelink interface corresponds to a PC5 interface. In some aspects, the IWF may correspond to a N3IWF.

FIG. 5 illustrates a flow chart of an example of a method 500 for wireless communication at a relay UE for NAS connection with a 5GC via the N3IWF. In an example, a UE 104 can perform the functions described in method 500 using one or more of the components described in FIGS. 1, 3, and 16. Further, the method 500 may be implemented according to the architecture shown in FIG. 12, which relates to a relay packet data session for UE-to-NW relay access via a N3IWF.

At block 502, the method 500 may include receiving at least one relay discovery parameter from a network entity. In an aspect, the communication component 342, e.g., in conjunction with processor(s) 312, memory 316, and/or transceiver 302, may be configured to receive at least one relay discovery parameter from a network entity. Thus, the UE 104, the processor(s) 312, the communication component 342 or one of its subcomponents may define the means for receiving at least one relay discovery parameter from a network entity. For instance, the relay UE may receive a wireless signal corresponding to a discovery parameter at one or more antennas or antenna arrays, and an RF front end and/or transceiver demodulates and decodes the signal to obtain data or instructions for use by the processor or modem.

At block 504, the method 500 may include determining, based at least on the at least one relay discovery parameter from a remote UE, at least one parameter for establishing one or more PDU sessions towards an IWF, while connected to the remote UE over a sidelink interface. In an aspect, the communication component 342, e.g., in conjunction with processor(s) 312, memory 316, and/or transceiver 302, may be configured to determine, based at least on the at least one relay discovery parameter from a remote UE, at least one parameter for establishing one or more PDU sessions towards an IWF, while connected to the remote UE over a sidelink interface. Thus, the UE 104, the processor(s) 312, the communication component 342 or one of its subcomponents may define the means for determining, based at least on the at least one relay discovery parameter from a remote UE, at least one parameter for establishing one or more PDU sessions towards an IWF, while connected to the remote UE over a sidelink interface.

At block 506, the method 500 may include establishing, for the remote UE, a single relay PDU session or multiple relay PDU sessions corresponding to the relay discovery parameter. In an aspect, the communication component 342, e.g., in conjunction with processor(s) 312, memory 316, and/or transceiver 302, may be configured to establish, for the remote UE, a single relay PDU session or multiple relay PDU sessions corresponding to the relay discovery parameter. Thus, the UE 104, the processor(s) 312, the communication component 342 or one of its subcomponents may define the means for establishing, for the remote UE, a single relay PDU session or multiple relay PDU sessions corresponding to the relay discovery parameter. For example, upon receiving an indication of an established IPSec tunnel with the remote UE, the relate UE may, via the onboard radio components, form a PDU session with the network for packet transmissions.

In some aspects, establishing the dual relay PDU session may correspond to the two PDU sessions includes determining at least one packet filter for the PDU sessions to restrict the NAS and UP data through the IWF to a specific PDU session.

In some aspects, the single relay PDU session may support communication of both NAS and UP data via the IWF.

In some aspects, the multiple relay PDU sessions may correspond to at least two PDU sessions may include: a first PDU session for relaying IKE/NAS and UP data of the remote UE via the N3IWF, and a second PDU session for relaying UP data of the remote UE to the DN directly.

In some aspects, the multiple relay PDU session may correspond to the two PDU sessions includes separate PDU sessions for relaying IKE/NAS and UP data of the remote UE via the IWF.

In some aspects, establishing the dual relay PDU session may correspond to two PDU sessions may include at least one of forming a NAS and UP data PDU session of the remote UE via the IWF, or forming the UP data PDU session when the IPSec tunnel with IWF is successfully established by the remote UE.

In some aspects, forming the UP data session may further be based on determining that one or more NAS messages with an IPSec tunnel mode are transmitted on a NAS PDU Session.

In some aspects, the method 500 may include transmitting, to the remote UE, a plurality of IP addresses for a unicast PC5 link, the one of the IP address is for relaying IKE/NAS and UP data of the remote UE via the N3IWF, and another IP address for relaying UP data of the remote UE to the DN directly. In an aspect, the communication component 342, e.g., in conjunction with processor(s) 312, memory 316, and/or transceiver 302, may be configured to transmit, to the remote UE, a plurality of IP addresses for a unicast PC5 link, the one of the IP address is for relaying IKE/NAS and UP data of the remote UE via the N3IWF, and another IP address for relaying UP data of the remote UE to the DN directly. Thus, the UE 104, the processor(s) 312, the communication component 342 or one of its subcomponents may define the means for transmitting, to the remote UE, a plurality of IP addresses for a unicast PC5 link, the one of the IP address is for relaying IKE/NAS and UP data of the remote UE via the N3IWF, and another IP address for relaying UP data of the remote UE to the DN directly. For example, the relay UE may transmit a wireless signal corresponding to a plurality of IP addresses for a unicast PC5 link via one or more antennas or antenna arrays, and an RF front end and/or transceiver modulates and encodes the signal for use by the processor or modem.

In some aspects, the method 500 may optionally include receiving, from the remote UE, an PC5 message on a PC5 unicast link indicating a successful establishment of the IPSec tunnel. In an aspect, the communication component 342, e.g., in conjunction with processor(s) 312, memory 316, and/or transceiver 302, may be configured to receive, from the remote UE, an PC5 message on a PC5 unicast link indicating a successful establishment of the IPSec tunnel. Thus, the UE 104, the processor(s) 312, the communication component 342 or one of its subcomponents may define the means for receiving, from the remote UE, an PC5 message on a PC5 unicast link indicating a successful establishment of the IPSec tunnel. For instance, the relay UE may receive a wireless signal corresponding to a PC5 message at one or more antennas or antenna arrays, and an RF front end and/or transceiver demodulates and decodes the signal to obtain data or instructions for use by the processor or modem.

In some aspects, the method 500 may optionally include transmitting a capability indication representing support for a connection to the network entity via the IWF in a registration message via a radio interface. In an aspect, the communication component 342, e.g., in conjunction with processor(s) 312, memory 316, and/or transceiver 302, may be configured to transmit a capability indication representing support for a connection to the network entity via the IWF in a registration message via a radio interface. Thus, the UE 104, the processor(s) 312, the communication component 342 or one of its subcomponents may define the means for transmitting a capability indication representing support for a connection to the network entity via the IWF in a registration message via a radio interface. For example, the relay UE may transmit a wireless signal corresponding to a capability indication via one or more antennas or antenna arrays, and an RF front end and/or transceiver modulates and encodes the signal for use by the processor or modem.

In some aspects, the method 500 may optionally include receiving, based on transmitting the capability indication, provisioning information including at least one ProSe parameter by an AMF. In an aspect, the communication component 342, e.g., in conjunction with processor(s) 312, memory 316, and/or transceiver 302, may be configured to receive, based on transmitting the capability indication, provisioning information including at least one ProSe parameter by an AMF. Thus, the UE 104, the processor(s) 312, the communication component 342 or one of its subcomponents may define the means for receiving, based on transmitting the capability indication, provisioning information including at least one ProSe parameter by an AMF. For instance, the relay UE may receive a wireless signal corresponding to a provisioning information at one or more antennas or antenna arrays, and an RF front end and/or transceiver demodulates and decodes the signal to obtain data or instructions for use by the processor or modem.

In some aspects, the method 500 may optionally include receiving, from the network entity, one or more relay service codes for the relay access via the IWF. In an aspect, the communication component 342, e.g., in conjunction with processor(s) 312, memory 316, and/or transceiver 302, may be configured to receive, from the network entity, one or more relay service codes for the relay access via the IWF. Thus, the UE 104, the processor(s) 312, the communication component 342 or one of its subcomponents may define the means for receiving, from the network entity, one or more relay service codes for the relay access via the IWF. For instance, the relay UE may receive a wireless signal corresponding to a relay service code at one or more antennas or antenna arrays, and an RF front end and/or transceiver demodulates and decodes the signal to obtain data or instructions for use by the processor or modem.

In some aspects, the network entity may correspond to a 5GC entity and the sidelink interface corresponds to a PC5 interface. In some aspects, the IWF may correspond to a N3IWF.

FIG. 6 illustrates a flow chart of an example of a method 600 for wireless communication at a remote UE for ATSSS. In an example, a UE 104 can perform the functions described in method 600 using one or more of the components described in FIGS. 1, 3, and 16. Further, the method 600 may be implemented according to the architecture shown in FIGS. 13, 14, and 15, as well as the features shown and described in FIGS. 17-23, which relate to ATSSS for UE-to-NW relays.

At block 602, the method 600 may determine satisfaction of a service continuity condition over a radio interface or a sidelink interface while connected to a network entity via a relay UE. In an aspect, the communication component 342, e.g., in conjunction with processor(s) 312, memory 316, and/or transceiver 302, may be configured to determine satisfaction of a service continuity condition over a radio interface or a sidelink interface while connected to a network entity via a relay UE. Thus, the UE 104, the processor(s) 312, the communication component 342 or one of its subcomponents may define the means for determining satisfaction of a service continuity condition over a radio interface or a sidelink interface while connected to a network entity via a relay UE. For example, the processor of the remote UE may identify that service continuity is preferred over a sidelink based on an operating parameter such as an active data connection.

At block 604, the method 600 may establish an MA-PDU session via at least one of the radio interface or an IWF. In an aspect, the communication component 342, e.g., in conjunction with processor(s) 312, memory 316, and/or transceiver 302, may be configured to establish a MA-PDU session via at least one of the radio interface or an IWF. Thus, the UE 104, the processor(s) 312, the communication component 342 or one of its subcomponents may define the means for establishing a MA-PDU session via at least one of the radio interface or an IWF. For instance, the remote UE may use one or more antennas or antenna arrays, and an RF front end and/or transceiver to obtain data or instructions for use by the processor or modem in establishing an MA-PDU session.

At block 606, the method 600 may communicate, with the network entity via the relay UE, data via the radio interface or the IWF. In an aspect, the communication component 342, e.g., in conjunction with processor(s) 312, memory 316, and/or transceiver 302, may be configured to communicate, with the network entity via the relay UE, data via the radio interface or the IWF. Thus, the UE 104, the processor(s) 312, the communication component 342 or one of its subcomponents may define the means for communicating, with the network entity via the relay UE, data via the radio interface or the IWF. For instance, the relay UE may communicate a wireless signal via one or more antennas or antenna arrays, and an RF front end and/or transceiver demodulates and decodes the signal to obtain data or instructions for use by the processor or modem.

In some aspects, establishing the MA-PDU session may be further based on an Access Traffic Steering, Switching and Splitting Lower Layer (ATSSS-LL) scheme or a MultiPath Transmission Control Protocol (MPTCP) scheme.

In some aspects, the method 600 may optionally include obtaining an IP address and one or more ATSSS rules used for the MA-PDU session establishment. In an aspect, the communication component 342, e.g., in conjunction with processor(s) 312, memory 316, and/or transceiver 302, may be configured to obtain an IP address and one or more ATSSS rules used for the MA-PDU session establishment. Thus, the UE 104, the processor(s) 312, the communication component 342 or one of its subcomponents may define the means for obtaining an IP address and one or more ATSSS rules used for the MA-PDU session establishment. For instance, the relay UE may receive a wireless signal corresponding to an IP address and ATSSS rules via one or more antennas or antenna arrays, and an RF front end and/or transceiver demodulates and decodes the signal to obtain data or instructions for use by the processor or modem. In some aspects, the IWF may correspond to a N3IWF.

Figure 7:
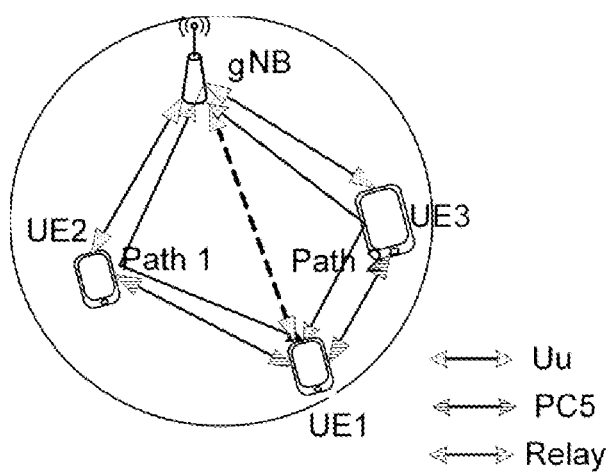
FIG. 7 is a conceptual diagram of a device-to-device (D2D) communication system in accordance with various aspects of the present disclosure.

FIG. 7 is a conceptual diagram of a device-to-device (D2D) communication system 700. For example, a first UE (e.g., UE1) may be a remote UE, and a second UE (e.g., UE2) and third UE (e.g., UE3) may be relay UEs. In such system 700, a Uu link may be established between the gNB and UE2 and UE3 and UE1 in some cases. The link between UE1 and UE2 and UE3 may be a PC5. Accordingly, data from the gNB may be relayed, on the downlink, via one or both of UE2 and UE3 to the UE1 via the Uu and PC5 interfaces or directly to the UE1 via Uu. Additionally, data from the UE1 may be transmitted to the gNB on the uplink via Uu directly or one or more of the UE2 and UE3. The features described herein with respect to FIG. 7 may be implemented in or used by methods 400 (FIG. 4) and 500 (FIG. 5).

Figure 8:
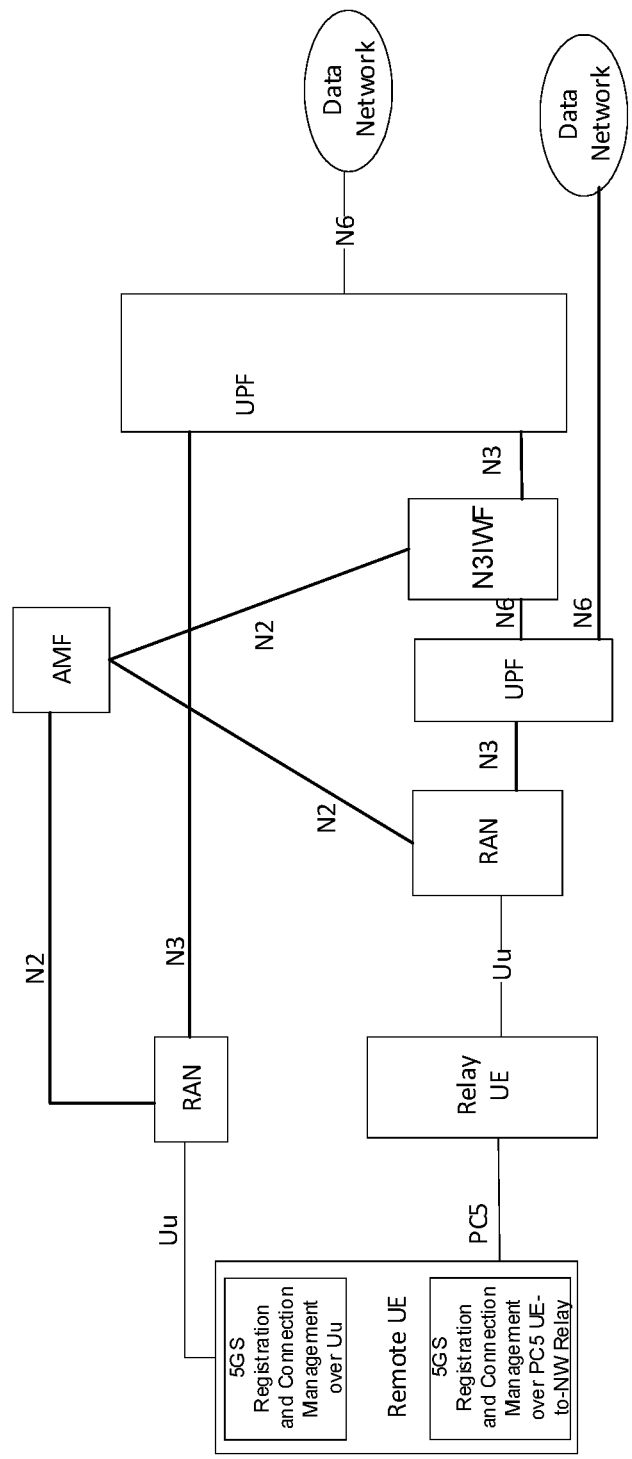
FIG. 8 is block diagram of a non-roaming architecture for a 5G core (5GC) system with UE-to-network (NW) relay access in accordance with various aspects of the present disclosure.

FIG. 8 is block diagram of a non-roaming architecture for a 5GC system 800 with UE-to-NW relay access. In the non-roaming architecture, the 5GS may extend the NAS registration and connection management over untrusted non-3GPP access using N3IWF for the UE-to-NW relay path. That is, the N3IWF may be reachable by the remote UE over the UE-to-NW relay access path. A remote UE may support independent 5GS registration and connection management procedures over Uu and UE-to-NW relay over PC5 with 5GC. Thus, the 5GC may authorize and authenticate the remote UE operation over UE-to-NW relay path. Further, the remote UE may discover the N3IWF and establish NAS connection with the network entity using the IPsec Security association with the N3IWF. Additionally, the relay UE may establish a relay PDU session (e.g., shared across other remote UEs) and relay both NAS and UP traffic to the N3IWF. The features described herein with respect to FIG. 8 may be implemented in or used by methods 400 (FIG. 4) and 500 (FIG. 5).

Figure 9:
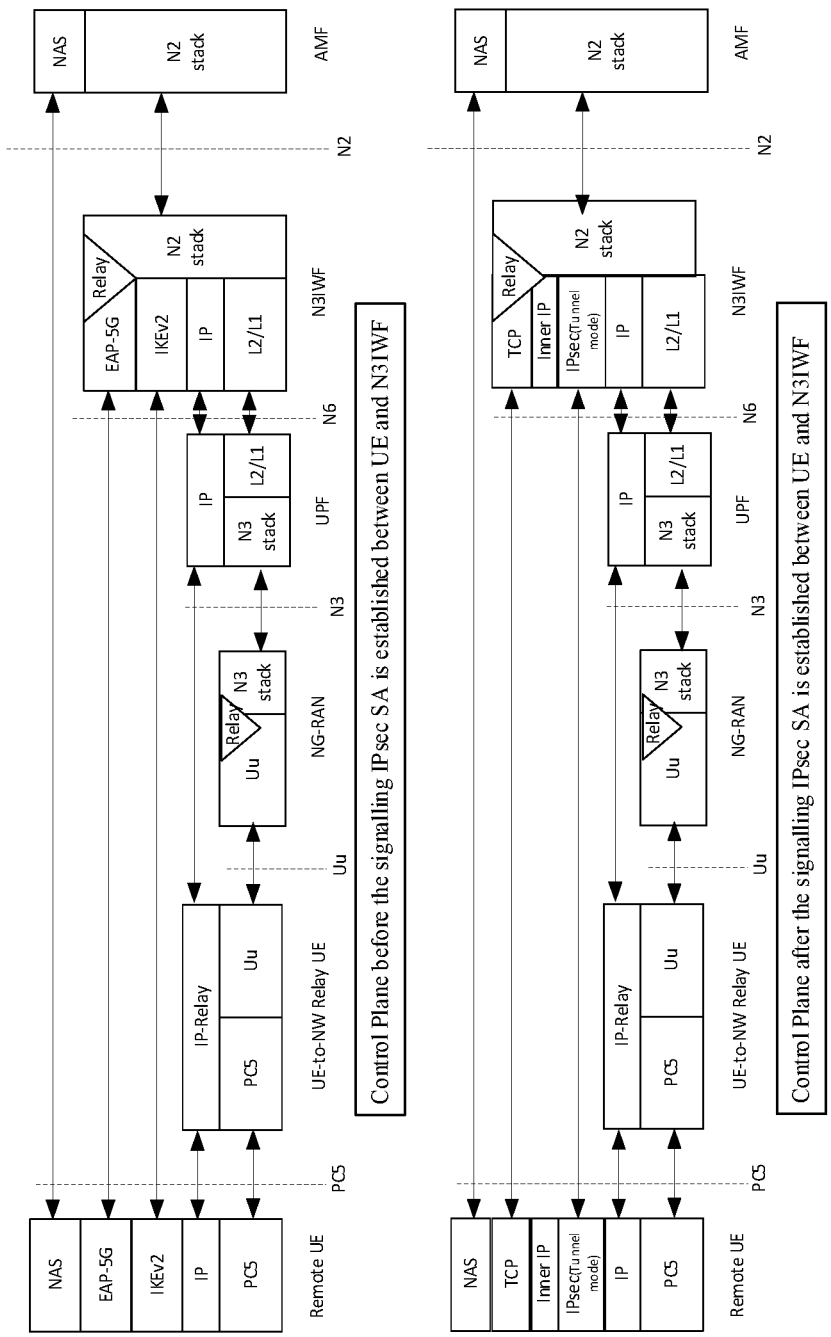
FIG. 9 is a conceptual diagram of control plane protocol stacks between a remote UE and an IWF for UE-to-NW relay access in accordance with various aspects of the present disclosure.

FIG. 9 is a conceptual diagram of control plane protocol stacks 900 between a remote UE and an IWF for UE-to-NW relay access. Specifically, a remote UE and the network may support 5GS registration and connection management from Remote UE to the network over UE-to-NW Relay access. The remote UE may establish a PC5 connection with the UE-to-NW relay and obtain an IP address. The remote UE may then establish an IPsec tunnel with the N3IWF over a PC5 relay path (e.g., IKE procedures). Similar to untrusted Non-3GPP access, subsequent NAS messages between the UE and N3IWF may be exchanged via the signaling IPsec SA over Transmission Control Protocol/Internet Protocol (TCP/IP) and over EAP-5G session. Further, authentication and authorization of a remote UE by 5GC can be supported similar to a radio interface (e.g., Uu). In some implementations, a remote UE may support NAS, EAP-5G, IKEv2 protocols to support 5GS registration and connection management with the 5GC over UE-to-NW relay access. Further, in some implementations, a remote UE may discover the N3IWF IP address and support an IPsec tunnel setup with the N3IWF using the IKE procedures over UE-to-NW relay access. The features described herein with respect to FIG. 9 may be implemented in or used by methods 400 (FIG. 4) and 500 (FIG. 5).

Figure 10:
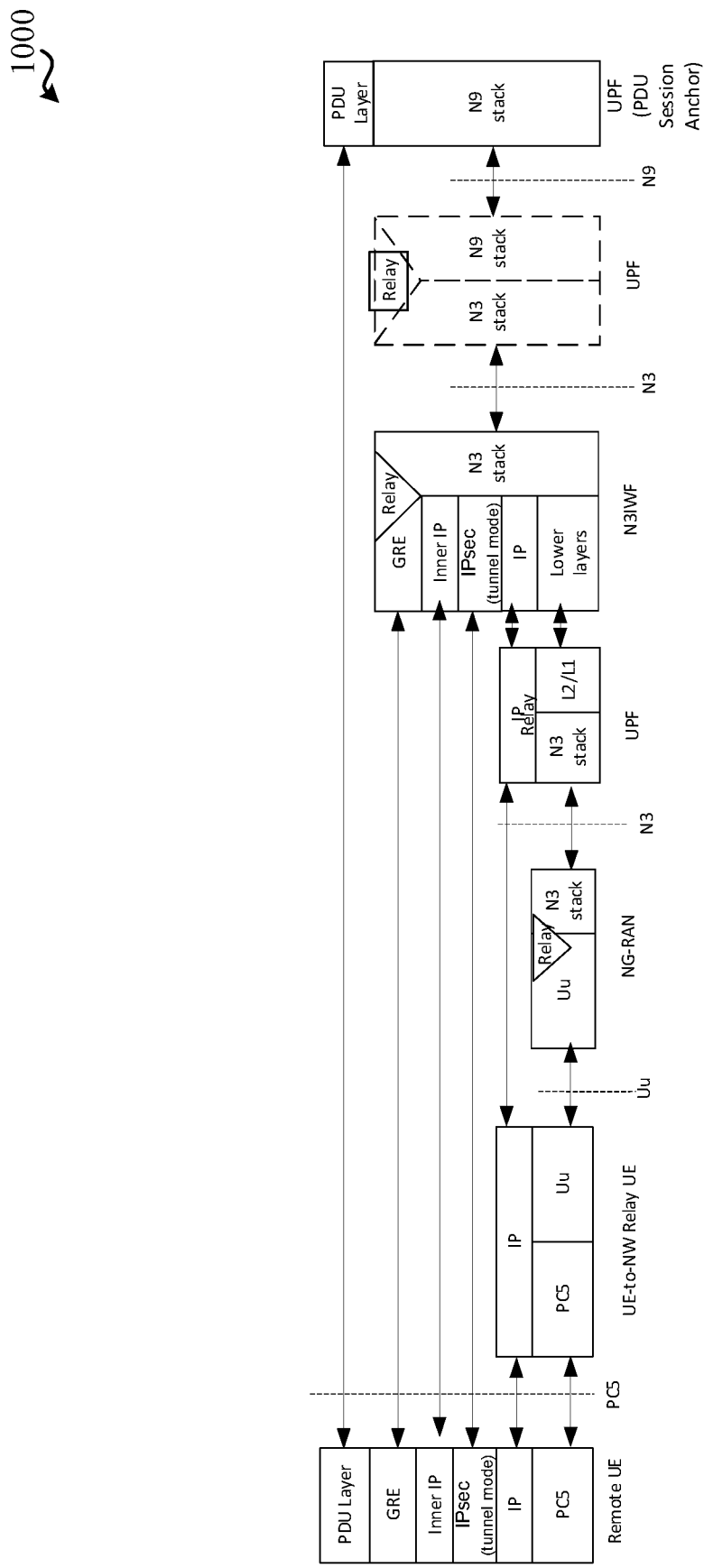
FIG. 10 is a conceptual diagram of user plane protocol stacks between a remote UE and an IWF for UE-to-NW relay access in accordance with various aspects of the present disclosure.

FIG. 10 is a conceptual diagram of user plane protocol stack 1000 between a remote UE and an IWF for UE-to-NW relay access. The relay UE may carry the remote UE user plane and NAS traffic over relay PDU Session(s) to the N3IWF. The N3IWF may then deliver the data to a user plane function (UPF). There may be multiple implementations to determine which relay PDU Session(s) the relay UE uses for a remote UE NAS and UP traffic relaying, as further described herein with respect to FIG. 11. The features described herein with respect to FIG. 10 may be implemented in or used by methods 400 (FIG. 4) and 500 (FIG. 5).

In some implementations, a remote UE may support PDU Session establishment/modification/release procedures with the 5GC for the remote UE traffic by transporting the PDU session management procedures over the IPsec tunnel established with N3IWF. Further, a remote UE can indicate in the PDU session establishment/modification messages that the PDU Session is for sending traffic via UE-to-NW relay access, by means of a special PDU Request type field. Additionally, a remote UE may transmit/receive the UP traffic over the PDU session(s) established for the remote UE traffic over PC5 UE-to-NW relay path via child IPSec tunnel to the N3IWF.

Figure 11:
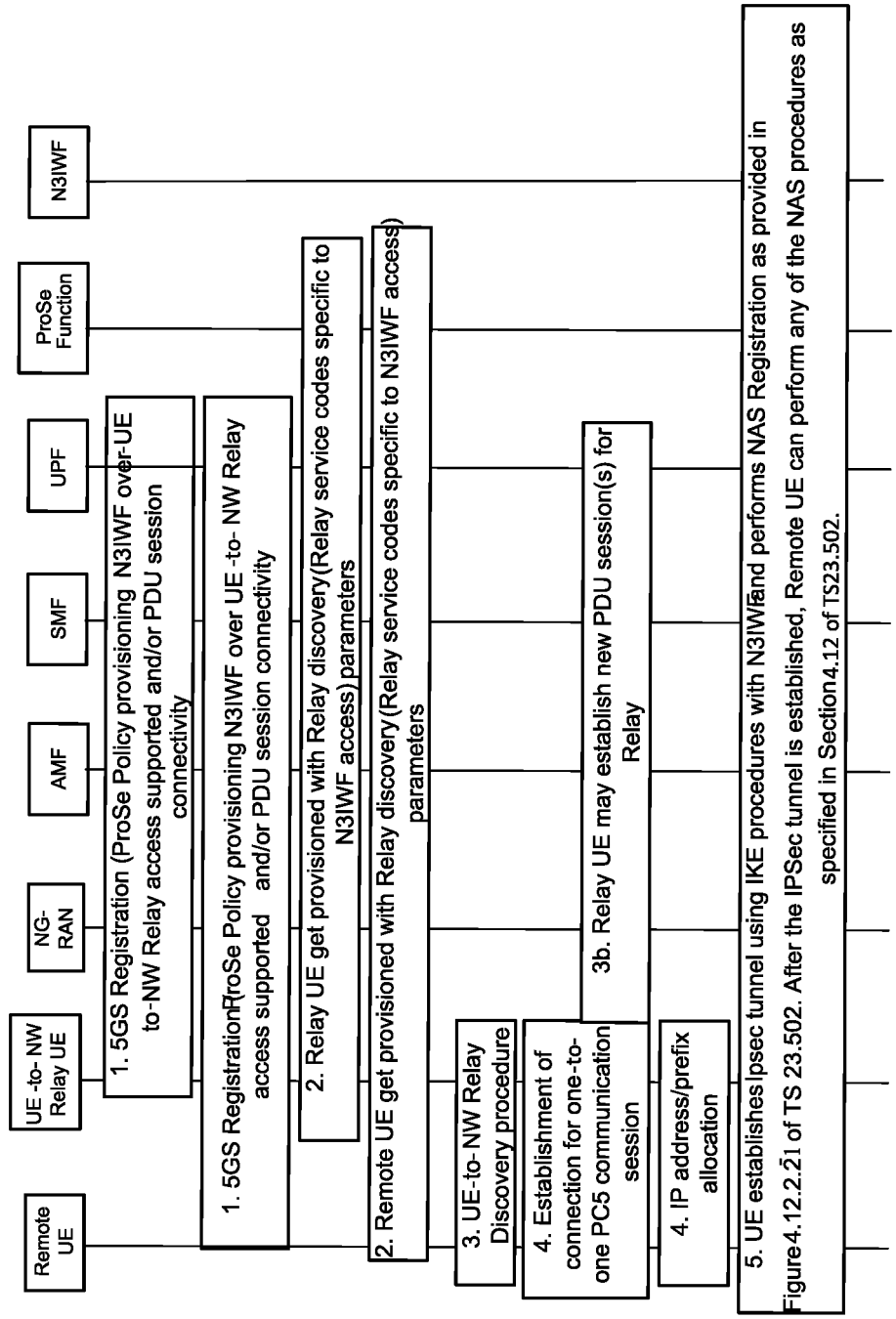
FIG. 11 is a flow diagram of a registration scheme for UE-to-NW relay access in accordance with various aspects of the present disclosure.

FIG. 11 is a flow diagram of a registration scheme 1100 for UE-to-NW relay access. At step 1, 5GS registration and/or PDU session connectivity between a relay UE and the UPF may occur. A remote UE and the UPF may also conduct 5GS registration and/or PDU session connectivity as part of step 1. At step 2, the relay UE and the remote UE may be provisioned with relay discovery parameters. At step 3, the remote UE may perform a UE-to-NW relay discovery procedure. At step 4, the remote UE may establish a connection for one-to-one PC5 communication session. At step 5, the remote UE may establish an IPsec tunnel using IKE procedure with the N3IWF. The features described herein with respect to FIG. 11 may be implemented in or used by methods 400 (FIG. 4) and 500 (FIG. 5).

When the remote UE and relay UE are in-coverage of gNB, they may perform Uu registration and obtain the N3IWF policy information. In some implementations, the remote UE and the relay UE may indicate the capability to support connection to the 5GC via N3IWF (i.e. support for IKE procedures to setup IPSec tunnel with N3IWF) in the Uu registration message (e.g., as part of step 1). In some implementations, during Uu registration, the relay UE and the remote UE may be provisioned with the policy/parameters for ProSe communications (e.g., including relay operations) by the AMF. The ProSe policy for relay operation may indicate to the relay UE, whether the network supports UE-to-NW Relay path access to 5GC via N3IWF and whether the relay UE is allowed to support access to 5GC via N3IWF. Further, the remote UE may operate while in out-of-coverage of gNB even without Uu Registration, and may be pre-configured with the N3IWF policy information.

An LTE ProSe UE-to-NW relay discovery approach may be based on the use of relay service codes to identify a connectivity service the ProSe relay UE provides. Remote UEs interested in a UE-to-NW relay for a connectivity service may discover the relay UE by monitoring only the corresponding relay service code. The Relay UE may establish a dedicated PDN connection over Uu for each relay service to provide support for UE-to-Network Relay connectivity. The relay UE may support multiple remote UEs looking for the connectivity service (e.g., relay service code) over the same packet data network (PDN) connection.

Further, the relay UE may establish a dedicated PDU session for each relay service code during PC5 unicast link setup with the remote UE. Each of these relay PDU sessions may be destined for different DN. In the case where the network has an N3IWF deployed for UE-to-NW relay access, the network may prefer to route remote UE UP traffic for certain relay service codes via N3IWF only after the network authorized the remote UE over NAS and not prior to that. This may provide end-to-end security via IPSec tunnel for the Remote UE UP traffic. Also, there may be some remote UEs which do not support or are not authorized for N3IWF connection or they do not need IPsec tunneling for UP traffic of certain services running on the Remote UE. For such services/remote UEs, the relay may route the traffic to the DN directly and not via N3IWF.

To support such differentiation for different services and different remote UEs, a number of implementations nay be used by the network and UE to provision the remote UE supporting N3IWF and the relay UE, which can connect to the N3IWF with these relay service codes. In one implementation, some relay service codes (e.g., within a certain range of values) may be reserved for operation via N3IWF.

In another implementation, within each relay service code (e.g., which may be of 24 bits length), the first few bits (e.g. 2 or 3 bits) may be reserved to indicate which kind of UE-to-NW Relay access is supported. That is, for '00'—regular UE-to-NW relay access may be implemented for this relay service code; '01'—UE-to-NW relay access via N3IWF; 10—UE-to-NW relay access via N3IWF and ATSSS may be supported; and 11—UE-to-NW relay access with ATSSS support only. In yet another implementation, each relay service code may be indicated for support of N3IWF access via special field or flag value received during relay parameter provisioning by a ProSe Function over PC3 or during discovery between the relay UE and the remote UE over PC5.

Accordingly, in some aspects, the 5GC network may indicate to the remote UE and relay UE the specific relay service codes may be allowed for the UE-to-NW relay access via N3IWF using the implementations described above. In a further aspect, a remote UE may initiate the IKE procedures for IPSec tunnel setup with N3IWF, and, NAS procedures over the IPSec tunnel when connected to a relay with support for N3IWF relay service codes.

Figure 12:
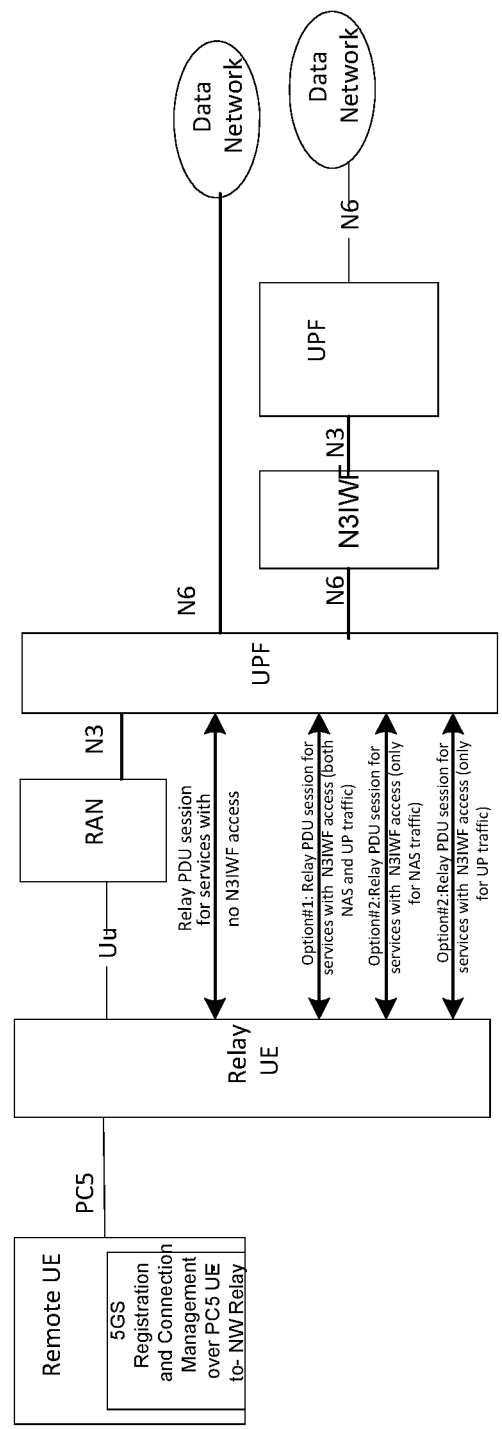
FIG. 12 is block diagram of a relay packet data unit (PDU) session for UE-to-NW access via an IWF in accordance with various aspects of the present disclosure.

FIG. 12 is block diagram of a relay PDU session for UE-to-NW access via an IWF 1200. Specifically, a relay UE may establish a dedicated PDN connection over a Uu interface for each relay service to provide support for UE-to-NW relay connectivity. The relay UE may support multiple remote UEs seeking connectivity service (e.g., relay service code) over the same PDN connection. In NR ProSe with UE-to-NW relay access via N3IWF, however, the network may prefer to have two different PDU sessions, one for NAS traffic from remote UE and another for UP traffic from the remote UE via N3IWF. Thus, there may be at least two implementations with respect to the relay PDU session setup as described herein. The features described herein with respect to FIG. 12 may be implemented in or used by methods 400 (FIG. 4) and 500 (FIG. 5).

In a first implementation, the relay UE may support one relay PDU session for both NAS and UP traffic. Specifically, UP traffic of remote UEs that do not have access to N3IWF can be supported via the regular relay PDU session with traffic sent directly to the DN. Further, the remote UE may use an IPSec tunnel setup with N3IWF and NAS over PC5 relay path setup, and another relay PDU session with access to N3IWF. Both the NAS and UP traffic of remote UE may be communicated using the foregoing PDU Session. In some aspects, restrictions to route NAS and UP traffic through N3IWF may be imposed via packet filter at the relay UE or relay UE PDU session UPF for the established PDU session.

In a second implementation, a relay UE may support two PDU sessions. A first PDU session may carry only NAS/IKE traffic and a second PDU Session may carry remote UE UP traffic. The relay UE may assign two IP addresses to the remote UE for unicast PC5 link, one to be used for UP traffic via N3IWF and other for UP traffic to DN directly. The relay UE may not allow the remote UE to send any UP traffic through NAS relay PDU session imposed via packet filters for the PDU session. Further, the relay UE can initiate the setup of PDU session for UP traffic when the IPSec tunnel with N3IWF is successfully setup by remote UE. Success of an IPSec tunnel setup may be indicated by the remote UE to relay UE using a PC5 message sent on the PC5 unicast link setup between relay UE and remote UE. Otherwise, the relay UE can setup the UP PDU Session after seeing NAS messages with IPSec tunnel mode being sent on the NAS PDU session.

Accordingly, in some aspects, a relay UE can setup one PDU session for relaying remote UE IKE/NAS and UP traffic via N3IWF, in addition to the PDU Session for relaying remote UE UP traffic to the DN directly and not through N3IWF. Further, the relay UE setup may separate PDU sessions for relaying remote UE IKE/NAS and UP traffic via N3IWF. Packet filters for the relay UE PDU sessions may be setup to restrict the NAS and UP traffic through N3IWF to specific PDU session(s). The relay UE may assign two IP addresses to the remote UE for unicast PC5 link, one to be used for NAS traffic and other for UP traffic. The relay UE ay initiate the setup of PDU session for UP traffic along with NAS PDU session setup or only setup the UP PDU session when the IPSec tunnel with N3IWF is successfully setup by Remote UE. The relay UE may establish the UP PDU Session after receiving NAS messages with IPSec tunnel mode being sent on the NAS PDU session. The remote UE may indicate the success of IPSec tunnel setup to relay UE using a PC5 message sent on the PC5 unicast link setup between relay UE and remote UE.

Figure 13:
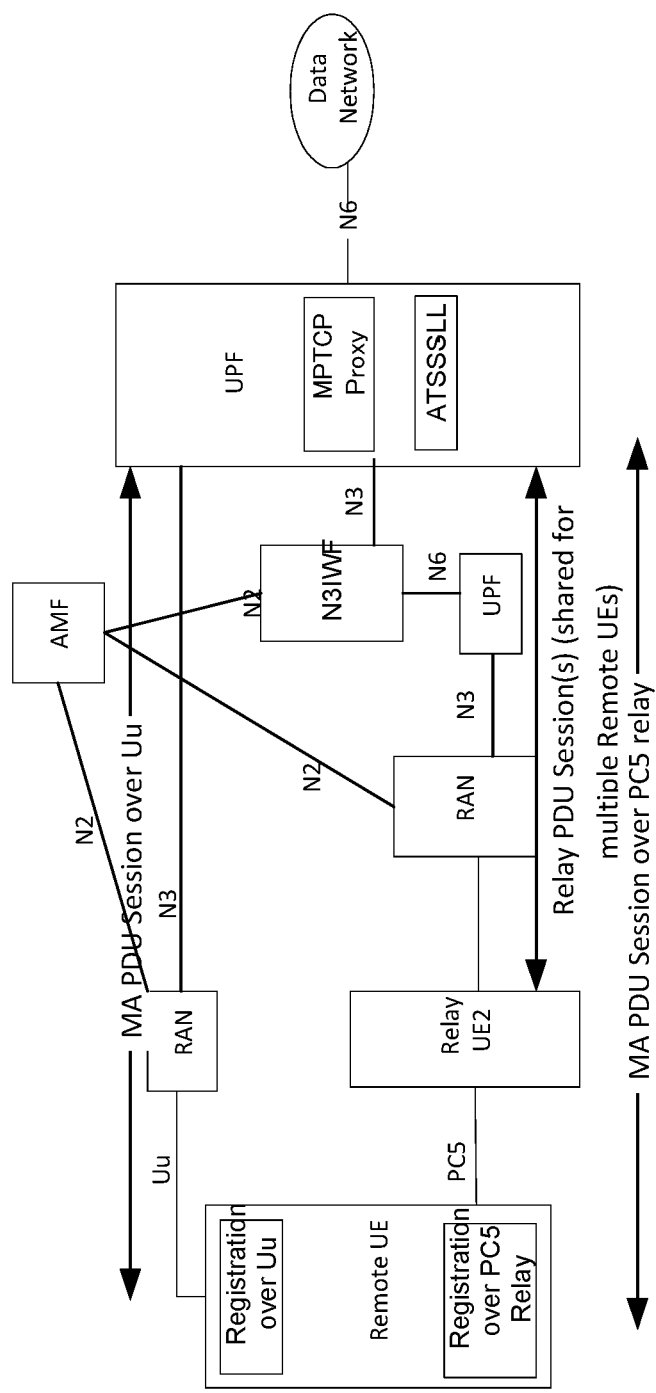
FIG. 13 illustrates an example non-roaming architecture for ATSSS support over a radio interface and UE-to-NW Relay access via IWF in accordance with various aspects of the present disclosure.

FIG. 13 illustrates an example non-roaming architecture for ATSSS support 1300 over a radio interface and UE-to-NW Relay access via IWF. Specifically, a network architecture is shown to support ATSSS across Uu and UE-to-NW relay access via N3IWF, to provide service continuity during path switch. In some aspects, the control plane and user plane stacks may be the same as the stacks shown in remote UE access via N3IWF in FIGS. 9 and 10. The features described herein with respect to FIG. 13 may be implemented in or used by method 600 (FIG. 6).

Figure 14:
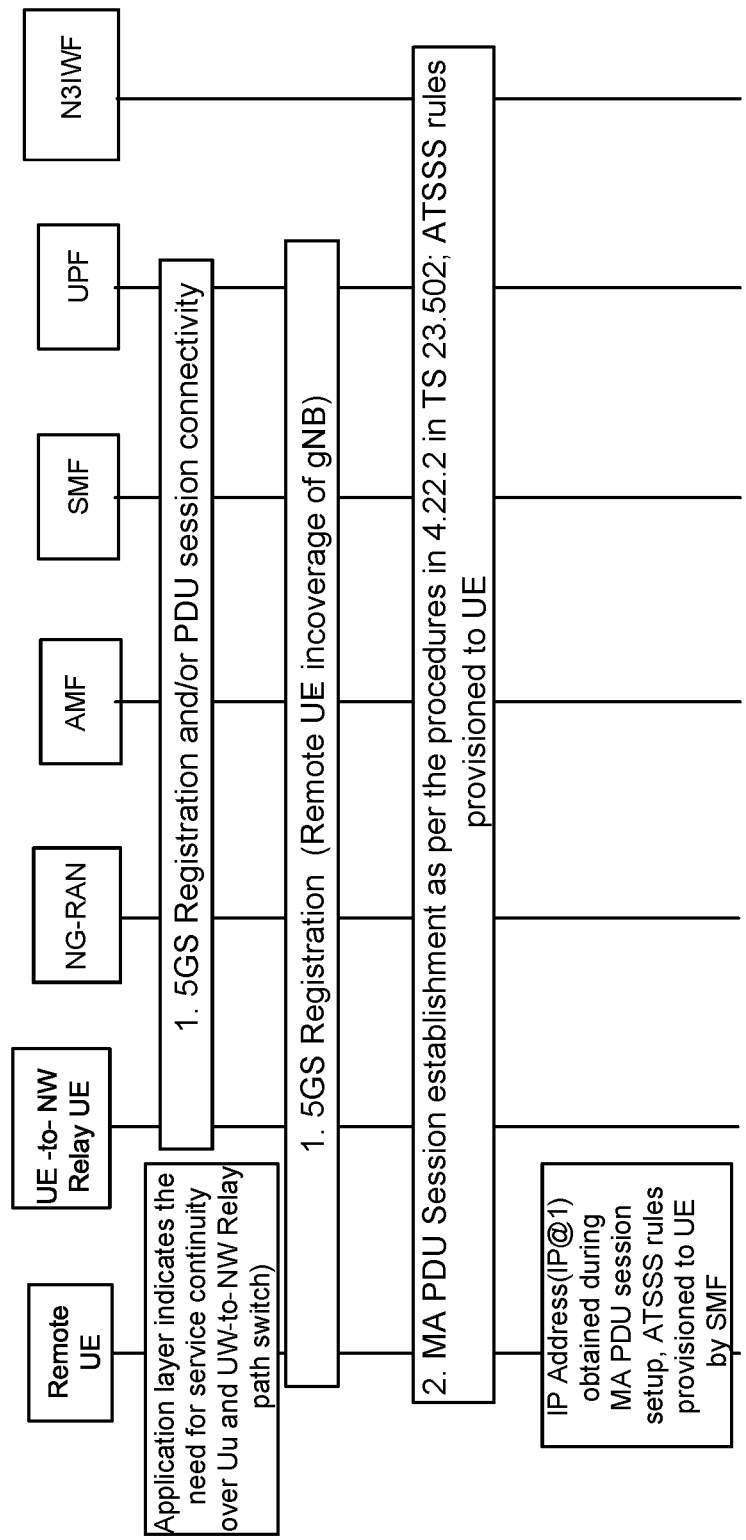
FIG. 14 is a flow diagram for a remote UE PDU session setup via a radio interface in accordance with various aspects of the present disclosure.

FIG. 14 is a flow diagram for a remote UE PDU session setup via a radio interface 1400. At the remote UE, the application layer may indicate a service continuity request over Uu and UE-to-NE relay path switch. At step 1, the remote UE and the relay UE may initiate 5GS registration and/or PDU session connectivity. At step 2, the remote UE may establish MA PDU session and the ATSSS rules provisioned to the UE. At the remote UE, an IP address may be obtained during MA PDU session setup, and the ATSSS rules may be provisioned to the UE by SMF. The features described herein with respect to FIG. 14 may be implemented in or used by method 600 (FIG. 6).

Figure 15:
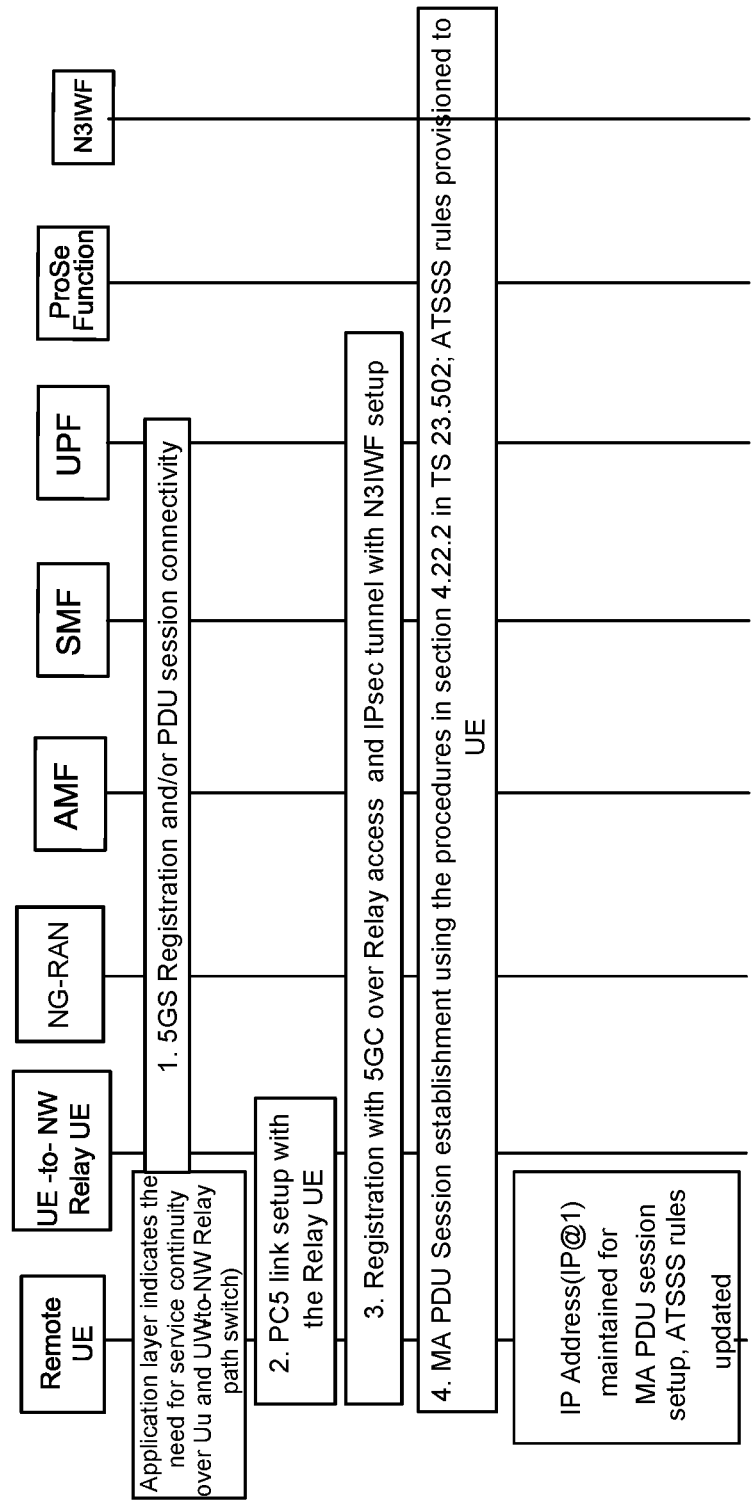
FIG. 15 is a flow diagram for a remote UE PDU session setup over UE-to-NW relay access via IWF in accordance with various aspects of the present disclosure.

FIG. 15 is a flow diagram for a remote UE PDU session setup over UE-to-NW relay access via IWF 1500. At the remote UE, the application layer may indicate a service continuity request over Uu and UE-to-NE relay path switch. At step 1, the remote UE and the relay UE may initiate 5GS registration and/or PDU session connectivity. At step 2, the remote UE may establish a PC5 link with the relay UE. At step 3, the remote UE may register with the 5GC over a relay access and establish a IPsec tunnel with the N3IWF. At step 4, the remote UE may establish MA PDU session and the ATSSS rules provisioned to the UE. At the remote UE, an IP address may be obtained during MA PDU session setup, and the ATSSS rules may be provisioned. The features described herein with respect to FIG. 15 may be implemented in or used by method 600 (FIG. 6).

In some implementations, the remote UE may have a MA PDU session setup over Uu. The remote UE may setup of MA PDU session over UE-to-NW relay path via N3IWF. Further, existing NAS over N3IWF and ATSSS may be leveraged for a MA PDU session setup.

In some implementations, a remote UE in-coverage of a gNB and registered over 5GS, or registered with a 5GC over a UE-to-NW relay access via N3IWF may establish MA PDU session(s) for service continuity to switch between Uu and UE-to-NW relay PC5 path. Further, remote UE may support the indication of MA PDU session, ATSSS-LL or MPTCP capability to the network similar to ATSSS feature. The remote UE may obtain an IP address and ATSSS rules to be used for the MA PDU session setup.

Figure 16:
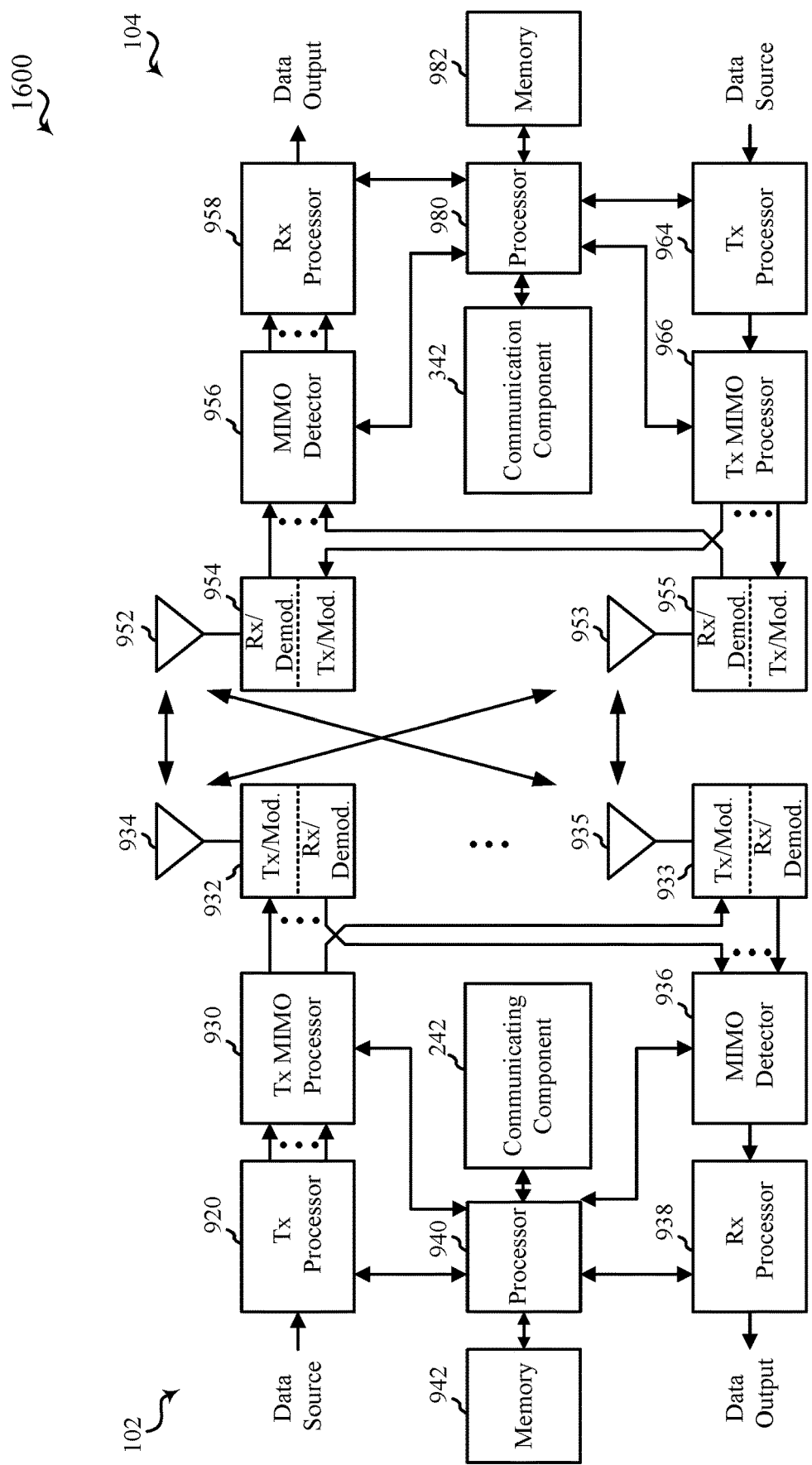
FIG. 16 is a block diagram illustrating an example of a MIMO communication system including a base station and a UE, in accordance with various aspects of the present disclosure.

FIG. 16 is a block diagram of a MIMO communication system 1600 including a base station 102, which may be acting as an IAB node or a parent node, and a UE 104. The MIMO communication system 1600 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1 and 2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

Figure 17:
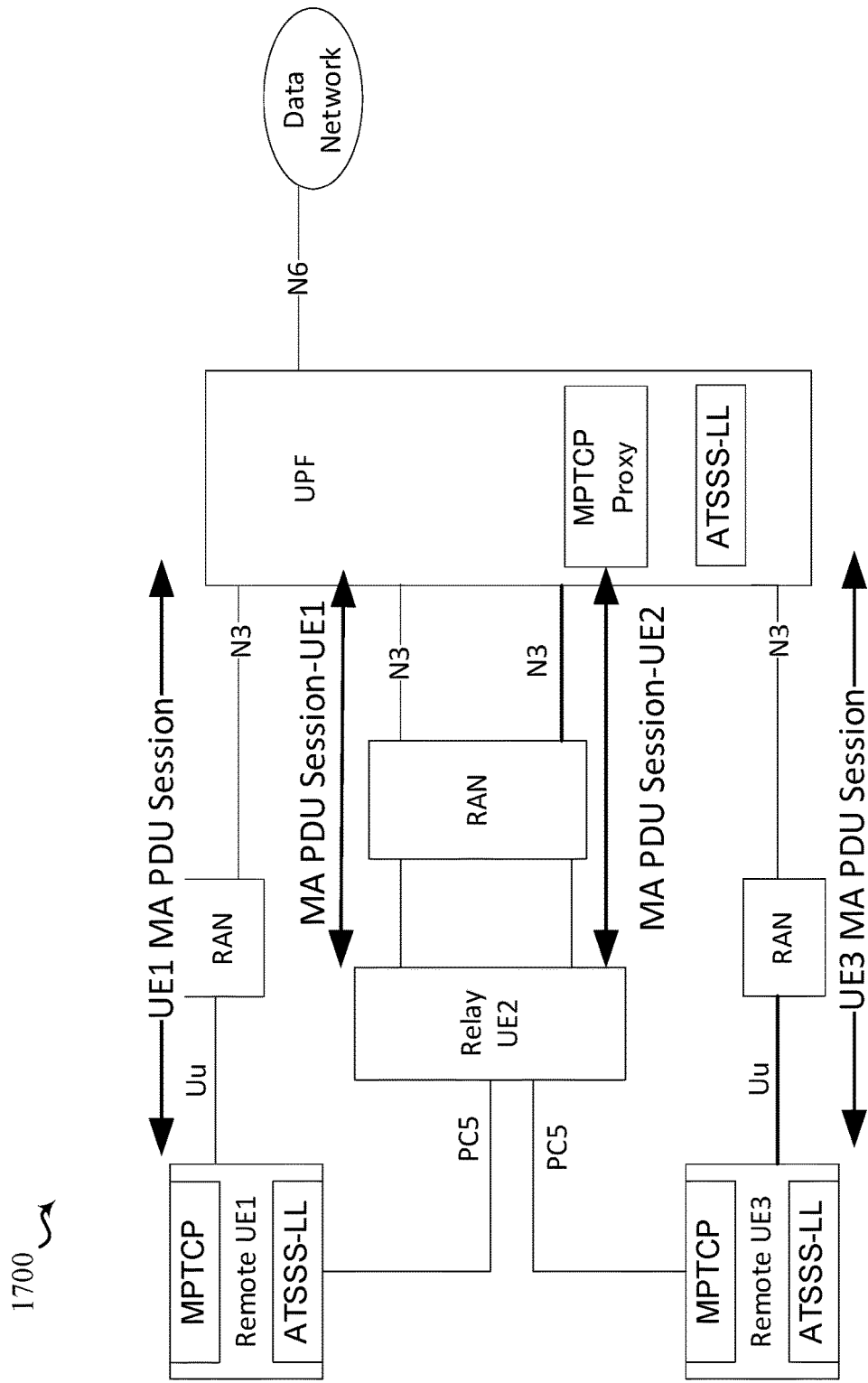
FIG. 17 is an example architecture for a system employing ATSSS in accordance with various aspects of the present disclosure.

Referring to FIG. 17, an example architecture 1700 for a system employing ATSSS. Specifically, a remote UE and user plane function (UPF) may support the ATSSS functionality to steer, switch and split the traffic across Uu access and the UE-to-NW Relay over PC5 access based on ATSSS rules. Further, ATSSS rules define how to handle the traffic across access paths, and may be Provisioned by SMF to UE and UPF.

In some implementations, the remote UE may be the MA PDU session end point. IP session continuity may be performed for this node during path switch. Two access paths (i.e., Uu and UE-to-NW Relay over PC5) may be seen by Remote UE In some implementations, session management function (SMF) supports the addition of two tunnels (i.e., one over Uu and other for the UE-to-NW relay access) for a single PDU connection.

In some implementations, both ATSSS-low layer (LL) and multipath transmission control protocol (MPTCP) steering functionality may be possible steering options. However, MPTCP may have a number of drawbacks. However, the foregoing may not usable for Ethernet traffic. Further, non-MPTCP traffic can only be sent on one access (i.e. Active-Standby only support). Further, such implementation may lose the benefit of other steering modes (i.e., smallest delay, load-balancing, and priority-based).

Figure 18:
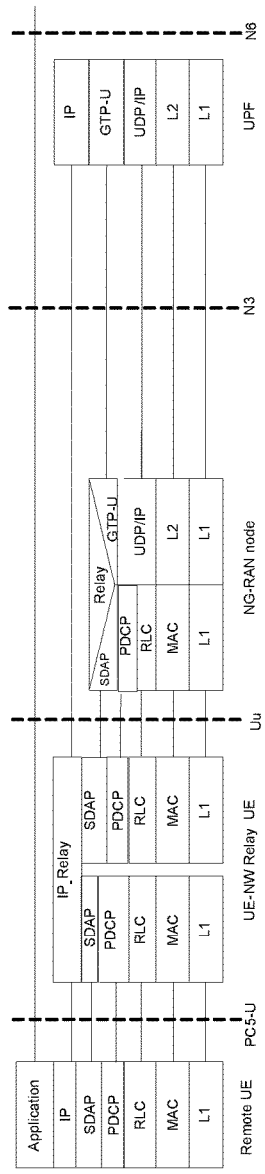
FIG. 18 is a user place protocol stack for ATSSS supporting UE-to-NW relays in accordance with various aspects of the present disclosure.

Referring to FIG. 18, a user place protocol stack 1800 is shown for ATSSS supporting UE-to-NW relays. In some implementations, the remote UE uplink traffic may be relayed via Layer 3 (L3) UE-to-NW relay over PC5. The relay UE may maintain a PDU Session per UE for each relay service code. In some implementations, NAS over UE-to-NW relay path may not be supported for the remote UE. The remote UE may be known to the NW via remote UE reports.

Figure 19:
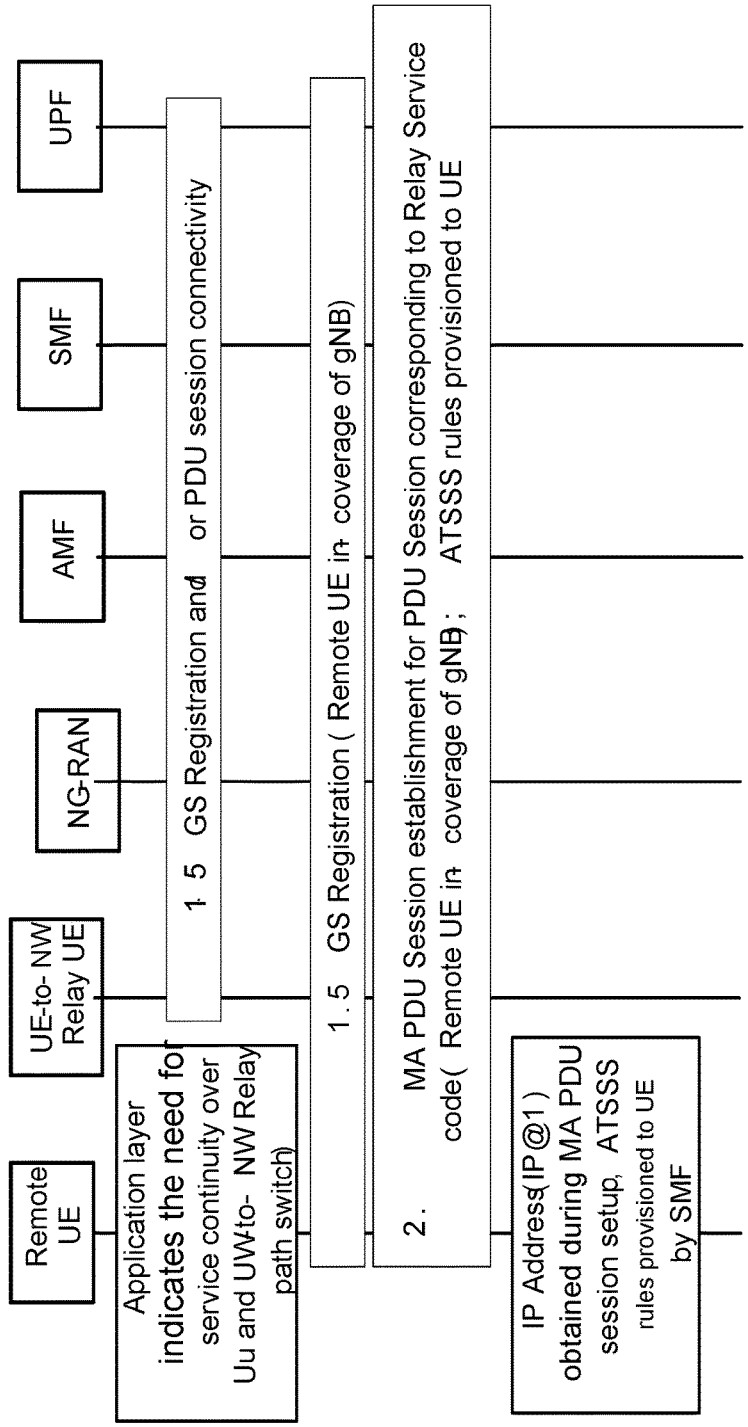
FIG. 19 is an initial MA PDU session setup over Uu in accordance with various aspects of the present disclosure.

Referring to FIG. 19, an initial MA PDU session setup over Uu 1900 is shown. For example, the remote UE, with no UE-to-NW relay path setup, in-coverage of gNB and registered over 5GS, may establish MA PDU session(s) over Uu, for specific relay service codes, that engage in session continuity. Further, the MA PDU session, ATSSS-LL or MPTCP capability indication may be similar to the ATSSS feature. Additionally, the remote UE may obtain an IP address and ATSSS rules during this process.

Figure 20:
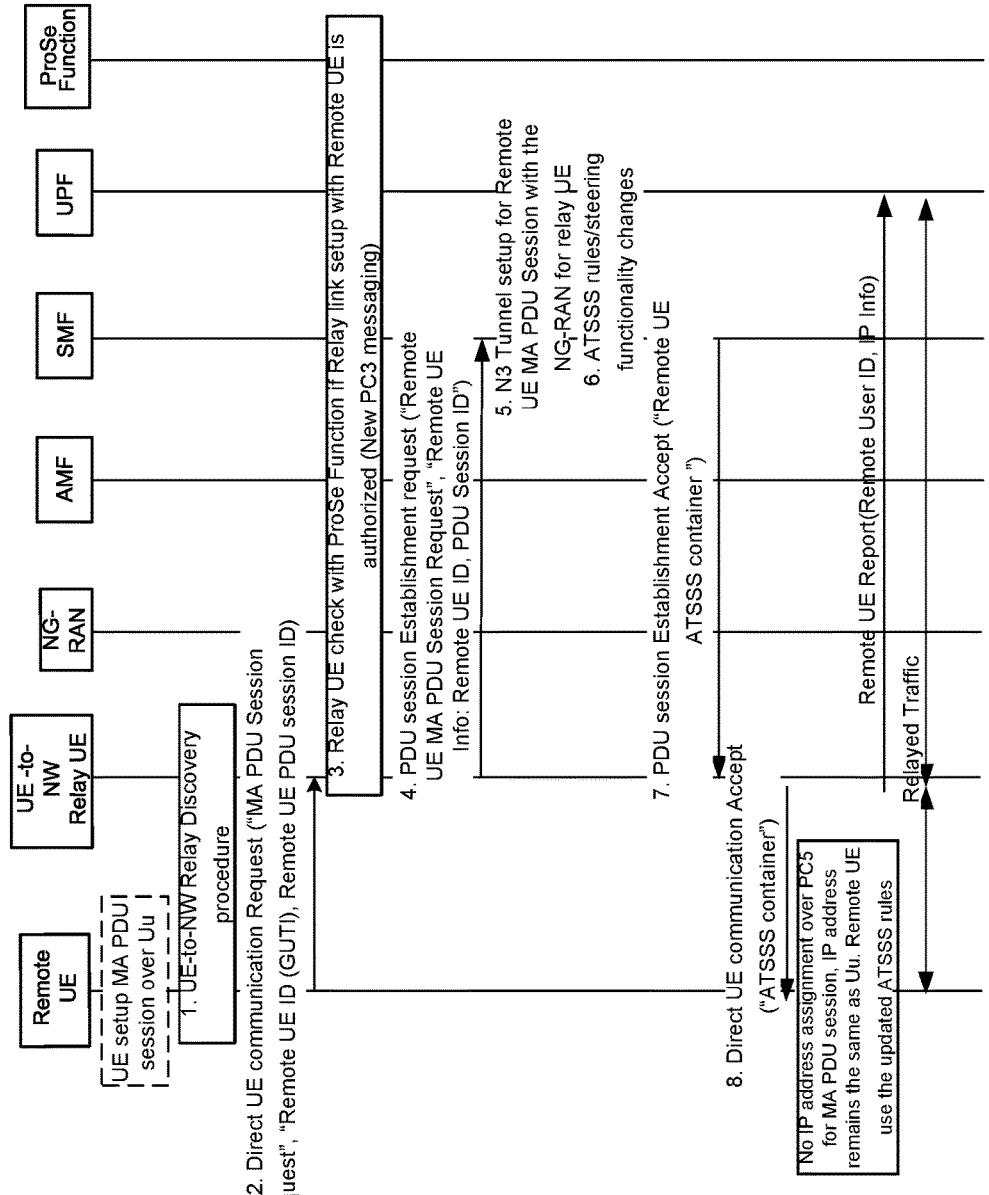
FIG. 20 is an multi access (MA) PDU session setup over PC5 relay path in accordance with various aspects of the present disclosure.

Referring to FIG. 20, a multi access (MA) PDU session setup over PC5 relay path 2000 (e.g., same AMF as Uu) is shown. For example, the remote UE may have a MA PDU Session setup over Uu. Further, the remote UE may indicate the need for continuing the MA PDU Session over UE-to-NW relay path by providing additional info in step 2. In some implementations, the MA PDU session over UE-to-NW relay path is supported by a number of adjustments (e.g., assuming the AMF corresponds to a Uu path): separate relay PDU session for each remote UE to reach to the same SMF/UPF as the remote UE PDU session (step 4), AMF may select the same SMF based on the remote UE PDU session ID to support the relay UE PDU Session (step 4), SMF may maintain the same IP address (i.e., used for the Remote UE) for this PDU session, SMF may coordinate with UPF to setup N3 tunnel towards the Relay UE RAN for the MA PDU Session corresponding to the Remote UE, SMF/UPF update the ATSSS rules to map the Remote UE traffic to two PDU Sessions (step 6): either Uu remote UE MA PDU Session or relay UE PDU Session corresponding to this remote UE.

In some aspects, the relay UE may include the ATSSS container with updates to the remote UE. Further, IP address assignment for the remote UE over PC5 may not be performed as the MA PDU Session may already be setup on the Uu interface. In one example, the remote UE with may establish the UE-NW relay path first, and then move into coverage of gNB to setup a MA PDU session and provide the relay PDU with a session identifier (ID) and relay UE ID for assisting AMF/SMF.

Figure 21:
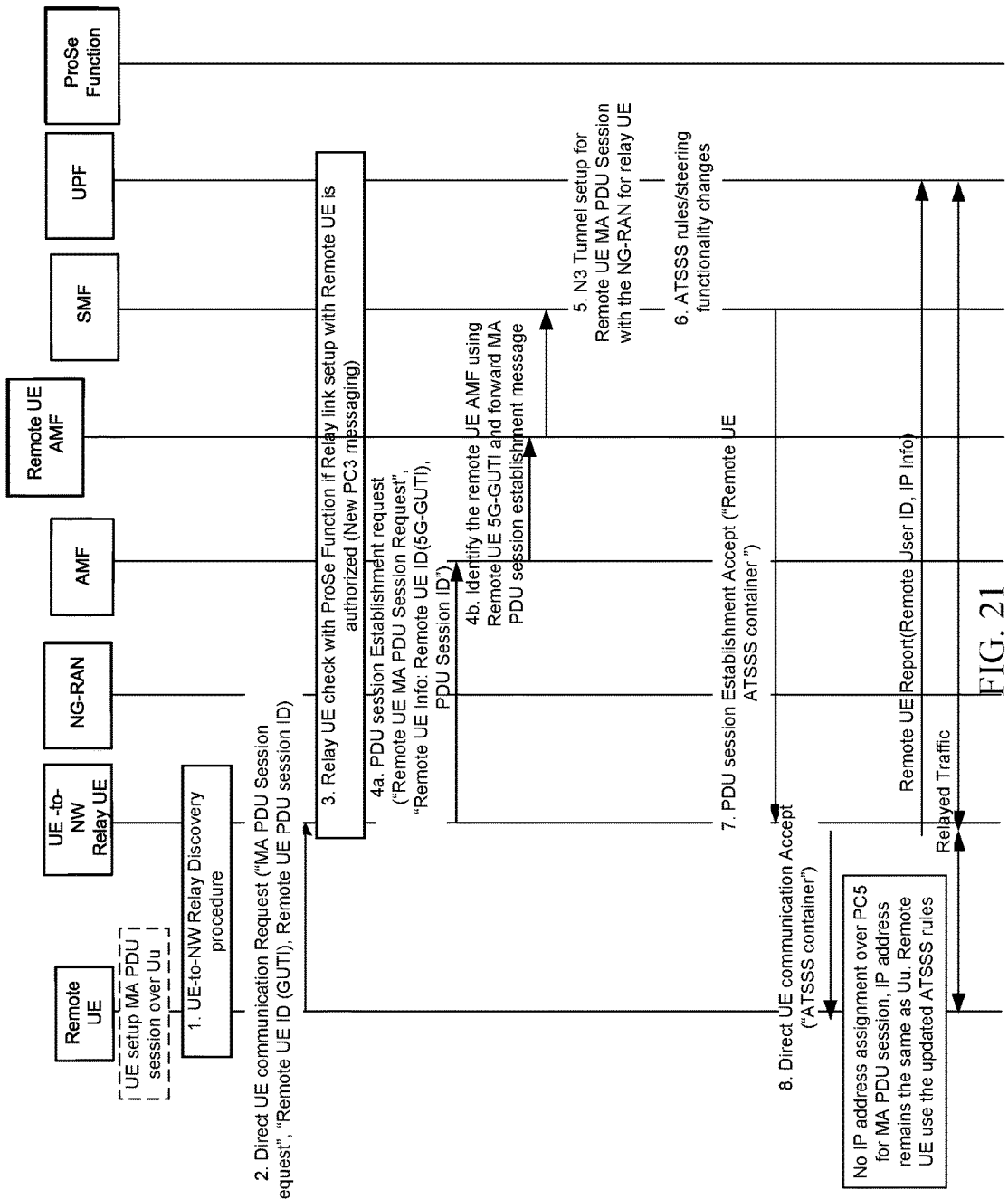
FIG. 21 is an MA PDU session setup over PC5 relay path in accordance with various aspects of the present disclosure.

Referring to FIG. 21, an MA PDU session setup over PC5 relay path 2100 (e.g., different AMF than Uu) as shown. In some implementations, the relay UE AMF is different than the remote UE AMF. In some implementations, the relay UE AMF identifies the Remote UE AMF using the remote UE 5G-Globally Unique Temporary Identifier (GUTI) received in MA PDU Session Establishment Request. In some implementations, the relay UE AMF forwards the remote UE MA PDU Session Establishment Request to the remote UE AMF (step 4b). In some implementations, the remote UE AMF processes the PDU Session Establishment Request upon reception from a remote UE, and forwards the request to the same SMF as Remote UE SMF.

Figure 22:
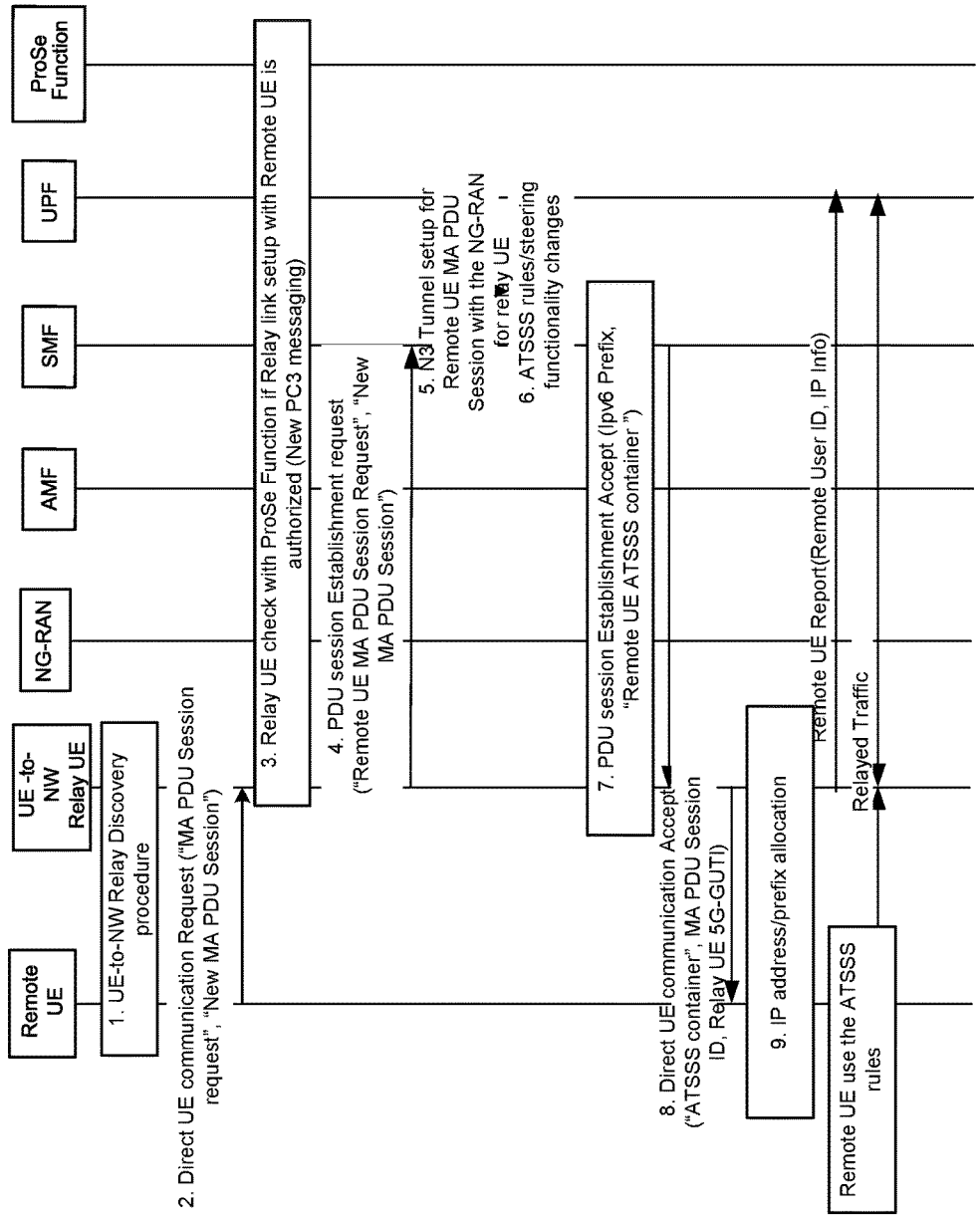
FIG. 22 is an initial MA PDU session setup over PC5 relay path in accordance with various aspects of the present disclosure.

Referring to FIG. 22, an initial MA PDU session setup over PC5 relay path 2200 is shown. The remote UE may not have an MA PDU session setup over Uu. The remote UE may initiate an MA PDU session setup over PC5 without indicating any remote UE PDU session IDs, and, indicating a new MA PDU Session. The relay UE may indicate the MA PDU session ID and relay UE 5G-GUTI to the remote UE (step 8) and supports IP address allocation over PC5 for the MA PDU session.

Figure 23:
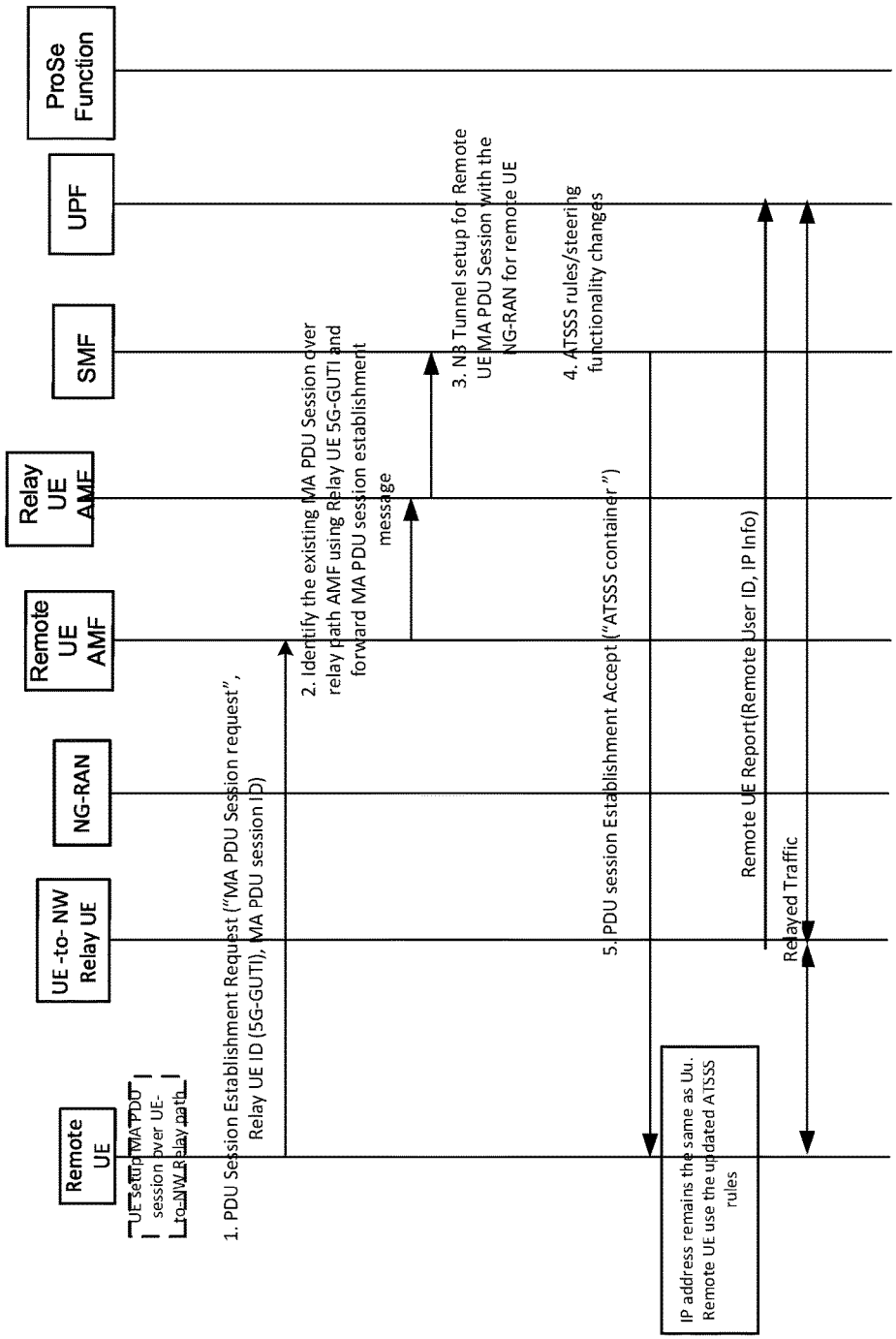
FIG. 23 is an MA PDU session setup over Uu procedure in accordance with various aspects of the present disclosure.

Referring to FIG. 23, an MA PDU session setup over Uu 2300 is shown (i.e., different AMF than relay UE). In some implementations, the remote UE may include the information about the MA PDU session established over PC5 relay path in the Uu request, includes the MA PDU session ID and relay UE ID in the Uu PDU Session Establishment Request message. The remote UE AMF may identify the relay UE AMF using the Relay UE 5G-GUTI received in MA PDU Session Establishment Request. The remote UE AMF may forward the remote UE MA PDU Session Establishment Request to the relay UE AMF (step 2). The Relay UE AMF may process the PDU Session establishment Request and forwards the request to the same SMF.

In an implementation relating to step 4b of FIG. 21, without NAS messaging tunneled between a remote UE and NW, and instead having a relay UE send NAS messages on behalf of a remote UE, trust issues may exist at the AMF. The relay UE mat request for an MA PDU session for the remote UE when the NAS message is not tunneled. In the case where the Uu is lost, and the remote UE only has a PC5 relay path, the network may not modify the PDU session information on the remote UE for the MA PDU session without any NAS support on Remote UE over PC5 relay path.

To address the above concerns, a NAS over a PC5 relay path may be supported for a remote UE. NAS messages from the remote UE can be tunneled in the relay UE NAS messages (i.e., NAS over NAS tunnel, using special packet data convergence protocol (PDCP) PDU type on PC5), without any IPSec tunnels setup like the N3IWF solution. MA PDU session management NAS messages may be generated by the remote UE. However, the network may establish the N3 tunnel towards the gNB corresponding to the relay UE. The relay UE may continue to support multiple PDU sessions for each UE similar to the aspects described herein relating to ATSSS for UE-to-NW relays (FIGS. 17-23).

SOME ADDITIONAL EXAMPLES

The aspects described herein additionally include one or more of the following implementation examples described in the following numbered clauses.

1. A method of wireless communications at a remote user equipment (UE), comprising:
discovering an Interworking Function (IWF) while connected to a relay UE over a sidelink interface;
establishing a non-access stratum (NAS) connection with a network entity via IWF; and
communicating, with the network entity via the relay UE and via the IWF.

2. The method of clause 1, wherein establishing the NAS connection includes performing 5GS registration and connection management with a 5G core (5GC) over UE-to-network (NW) relay access.

3. The method of any preceding clause, wherein establishing the NAS connection includes establishing an Internet Protocol Security (IPsec) tunnel with the IWF using an Internet Key Exchange (IKE) protocol over the relay UE access.

4. The method of any preceding clause, wherein establishing the NAS connection further includes transmitting packet data unit (PDU) session management information associated with a PDU session to the network entity over the IPsec tunnel established with N3IWF to establish a PDU session.

5. The method of any preceding clause, wherein transmitting the PDU session management information includes transmitting a PDU session request type field to indicate that the PDU session is for transmitting data via the relay UE access.

6. The method of any preceding clause, wherein communicating data with the network entity includes communicating data for the PDU session with the network entity or a different network entity over the sidelink interface and via the IPSec tunnel to the IWF.

7. The method of any preceding clause, wherein establishing the NAS connection includes establishing an extensible authentication protocol (EAP)-5G session using an EAP-5G protocol with the IWF.

8. The method of any preceding clause, further comprising:
transmitting a capability indication representing support for a connection to the network entity via the IWF in a registration message via a radio interface; and
receiving, at least based on transmitting the capability indication, provisioning information including at least one ProSe parameter from the network entity.

9. The method of any preceding clause, further comprising receiving, from the network entity via the relay UE, one or more relay service codes for relay access via IWF.

10. The method of any preceding clause, wherein each relay service code of the one or more relay service codes include reservation bits to indicate a type of supported relay access, or wherein the one or more relay service codes include a flag indicating support for IWF access.

11. The method of any preceding clause, wherein the network entity corresponds to a 5G Core (5GC) entity and the sidelink interface corresponds to a PC5 interface, and wherein the IWF corresponds to a Non-3GPP Interworking Function (N3IWF).

12. A method of wireless communications at a relay user equipment (UE), comprising:
receiving at least one relay discovery parameter from a network entity;
determining, based at least on the at least one relay discovery parameter from a remote UE, at least one parameter for establishing one or more packet data unit (PDU) sessions towards an Interworking Function (IWF), while connected to the remote UE over a sidelink interface; and
establishing, for the remote UE, a single relay PDU session or multiple relay PDU sessions corresponding to the relay discovery parameter.

13. The method of clause 12, wherein the single relay PDU session supports communication of both Non-Access Stratum (NAS) and User Plane (UP) data via the IWF.

14. The method of any preceding clause, wherein the multiple relay PDU sessions corresponding to at least two PDU sessions include:
a first PDU session for relaying Internet Key Exchange (IKE)/Non-Access Stratum (NAS) and User Plane (UP) data of the remote UE via a non-3GPP IWF (N3IWF), and a second PDU session for relaying UP data of the remote UE to the Data Network (DN) directly.

15. The method of any preceding clause, wherein the multiple relay PDU session corresponding to the two PDU sessions includes separate PDU sessions for relaying Internet Key Exchange (IKE)/Non-Access Stratum (NAS) and User Plane (UP) data of the remote UE via the IWF.

16. The method of any preceding clause, wherein establishing the single relay PDU session or multiple relay PDU sessions includes determining at least one packet filter for the PDU sessions to restrict the Non-Access Stratum (NAS) and User Plane (UP) data through the IWF to a specific PDU session.

17. The method of any preceding clause, further comprising transmitting, to the remote UE, a plurality of Internet Protocol (IP) addresses for a unicast PC5 link, wherein one of the IP address is for User Plane (UP) traffic via IWF and another IP address is for UP traffic sent to DN directly.

18. The method of any preceding clause, wherein establishing the single relay PDU session or multiple relay PDU sessions includes at least one of:
forming a Non-Access Stratum (NAS) and User Plane (UP) data session of the remote UE via the IWF, or
forming the UP data session when an Internet Protocol Security (IPSec) tunnel with IWF is successfully established by the remote UE.

19. The method of any preceding clause, wherein forming the UP data session is further based on determining that one or more NAS messages with an IPSec tunnel mode are transmitted on a NAS PDU Session.

20. The method of any preceding clause, further comprising receiving, from the remote UE, an PC5 message on a PC5 unicast link indicating a successful establishment of an Internet Protocol Security (IPSec) tunnel.

21. The method of any preceding clause, further comprising:
transmitting a capability indication representing support for a connection to the network entity via the IWF in a registration message via a radio interface; and
receiving, based on transmitting the capability indication, provisioning information including at least one ProSe parameter by an Access and Mobility Management Function (AMF).

22. The method of any preceding clause, further comprising receiving, from the network entity, one or more relay service codes for relay access via the IWF.

23. The method of any preceding clause, wherein the network entity corresponds to a 5G Core (5GC) entity and the sidelink interface corresponds to a PC5 interface, and wherein the IWF corresponds to a Non-3GPP Interworking Function (N3IWF).

24. An apparatus corresponding to a remote UE for wireless communication, comprising:
a transceiver;
a memory configured to store instructions; and
at least one processor communicatively coupled with the transceiver and the memory, wherein the at least one processor is configured to:
discover an Interworking Function (IWF) while connected to a relay UE over a sidelink interface;
establish a non-access stratum (NAS) connection with a network entity via IWF; and
communicate, with the network entity via the relay UE and via the IWF.

25. The apparatus of clause 24, wherein to establish the NAS connection, the at least one processor is configured to perform 5GS registration and connection management with a 5G core (5GC) over UE-to-network (NW) relay access.

26. The apparatus of any preceding clause, wherein the at least one processor is configured to:
transmit a capability indication representing support for a connection to the network entity via the IWF in a registration message via a radio interface; and
receive, at least based on transmitting the capability indication, provisioning information including at least one ProSe parameter from the network entity.

27. The apparatus of any preceding clause, wherein the at least one processor is configured to receive, from the network entity via the relay UE, one or more relay service codes for relay access via IWF.

28. An apparatus corresponding to a relay UE for wireless communication, comprising:
a transceiver;
a memory configured to store instructions; and
at least one processor communicatively coupled with the transceiver and the memory, wherein the at least one processor is configured to:
receive at least one relay discovery parameter from a network entity;
determine, based at least on the at least one relay discovery parameter from a remote UE, at least one parameter for establishing one or more PDU sessions towards an Interworking Function (IWF), while connected to the remote UE over a sidelink interface; and
establish, for the remote UE, a single relay PDU session or multiple relay PDU sessions corresponding to the relay discovery parameter.

29. The apparatus of clause 28, wherein the single relay PDU session supports communication of both Non-Access Stratum (NAS) and User Plane (UP) data via the IWF.

30. The apparatus of any preceding clause, wherein the multiple relay PDU sessions corresponding to at least two PDU sessions include:
a first PDU session for relaying Internet Key Exchange (IKE)/Non-Access Stratum (NAS) and User Plane (UP) data of the remote UE via a non-3GPP IWF (N3IWF), and
a second PDU session for relaying UP data of the remote UE to a Data Network (DN) directly.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a relay user equipment (UE), comprising:
   receiving at least one relay discovery parameter from a network entity;
   determining, based at least on the at least one relay discovery parameter, at least one parameter for establishing one or more packet data unit (PDU) sessions towards an Interworking Function (IWF), while connected to a remote UE over a sidelink interface; and
   establishing, for the remote UE, a single relay PDU session or multiple relay PDU sessions corresponding to the at least one relay discovery parameter.

2. The method of claim 1, wherein the single relay PDU session supports communication of both Non-Access Stratum (NAS) and User Plane (UP) data via the IWF.

3. The method of claim 1, wherein the multiple relay PDU sessions corresponding to at least two PDU sessions include:
   a first PDU session for relaying Internet Key Exchange (IKE)/Non-Access Stratum (NAS) and User Plane (UP) data of the remote UE via a non-3GPP IWF (N3IWF), and
   a second PDU session for relaying UP data of the remote UE to the Data Network (DN) directly.

4. The method of claim 1, wherein the multiple relay PDU session corresponding to the two PDU sessions includes separate PDU sessions for relaying Internet Key Exchange (IKE)/Non-Access Stratum (NAS) and User Plane (UP) data of the remote UE via the IWF.

5. The method of claim 1, wherein establishing the single relay PDU session or multiple relay PDU sessions includes determining at least one packet filter for the PDU sessions to restrict the Non-Access Stratum (NAS) and User Plane (UP) data through the IWF to a specific PDU session.

6. The method of claim 1, further comprising transmitting, to the remote UE, a plurality of Internet Protocol (IP) addresses for a unicast PC5 link, wherein one of the IP address is for User Plane (UP) traffic via IWF and another IP address is for UP traffic sent to DN directly.

7. The method of claim 1, wherein establishing the single relay PDU session or multiple relay PDU sessions includes at least one of:
   forming a Non-Access Stratum (NAS) and User Plane (UP) data session of the remote UE via the IWF, or
   forming the UP data session when an Internet Protocol Security (IPSec) tunnel with IWF is successfully established by the remote UE.

8. The method of claim 7, wherein forming the UP data session is further based on determining that one or more NAS messages with an IPSec tunnel mode are transmitted on a NAS PDU Session.

9. The method of claim 1, further comprising receiving, from the remote UE, an PC5 message on a PC5 unicast link indicating a successful establishment of an Internet Protocol Security (IPSec) tunnel.

10. The method of claim 1, further comprising:
    transmitting a capability indication representing support for a connection to the network entity via the IWF in a registration message via a radio interface; and
    receiving, based on transmitting the capability indication, provisioning information including at least one ProSe parameter by an Access and Mobility Management Function (AMF).

11. The method of claim 1, further comprising receiving, from the network entity, one or more relay service codes for relay access via the IWF.

12. The method of claim 1, wherein the network entity corresponds to a 5G Core (5GC) entity and the sidelink interface corresponds to a PC5 interface, and wherein the IWF corresponds to a Non-3GPP Interworking Function (N3IWF).

13. An apparatus corresponding to a relay UE for wireless communication, comprising:
    memory; and
    at least one processor coupled with the memory, wherein the at least one processor is configured to:
    receive at least one relay discovery parameter from a network entity;
    determine, based at least on the at least one relay discovery parameter, at least one parameter for establishing one or more PDU sessions towards an Interworking Function (IWF), while connected to a remote UE over a sidelink interface; and establish, for the remote UE, a single relay PDU session or multiple relay PDU sessions corresponding to the at least one relay discovery parameter.

14. The apparatus of claim 13, wherein the single relay PDU session supports communication of both Non-Access Stratum (NAS) and User Plane (UP) data via the IWF.

15. The apparatus of claim 13, wherein the multiple relay PDU sessions corresponding to at least two PDU sessions include:
a first PDU session for relaying Internet Key Exchange (IKE)/Non-Access Stratum (NAS) and User Plane (UP) data of the remote UE via a non-3GPP IWF (N3IWF), and
a second PDU session for relaying UP data of the remote UE to a Data Network (DN) directly.

16. The apparatus of claim 13, wherein the multiple relay PDU session corresponding to the two PDU sessions includes separate PDU sessions for relaying Internet Key Exchange (IKE)/Non-Access Stratum (NAS) and User Plane (UP) data of the remote UE via the IWF.

17. The apparatus of claim 13, wherein to establish the single relay PDU session or multiple relay PDU sessions, the at least one processor is further configured to determine at least one packet filter for the PDU sessions to restrict the Non-Access Stratum (NAS) and User Plane (UP) data through the IWF to a specific PDU session.

18. The apparatus of claim 13, wherein the at least one processor is further configured to transmit, to the remote UE, a plurality of Internet Protocol (IP) addresses for a unicast PC5 link, wherein one of the IP address is for User Plane (UP) traffic via IWF and another IP address is for UP traffic sent to DN directly.

19. The apparatus of claim 13, wherein to establish the single relay PDU session or multiple relay PDU sessions, the at least one processor is further configured to include at least one of:
form a Non-Access Stratum (NAS) and User Plane (UP) data session of the remote UE via the IWF, or
form the UP data session when an Internet Protocol Security (IPSec) tunnel with IWF is successfully established by the remote UE.

20. The apparatus of claim 19, wherein forming the UP data session is further based on determining that one or more NAS messages with an IPSec tunnel mode are transmitted on a NAS PDU Session.

21. The apparatus of claim 13, wherein the at least one processor is further configured to receive, from the remote UE, an PC5 message on a PC5 unicast link indicating a successful establishment of an Internet Protocol Security (IPSec) tunnel.

22. The apparatus of claim 13, wherein the at least one processor is further configured to:
transmit a capability indication representing support for a connection to the network entity via the IWF in a registration message via a radio interface; and
receive, based on transmitting the capability indication, provisioning information including at least one ProSe parameter by an Access and Mobility Management Function (AMF).

23. The apparatus of claim 13, wherein the at least one processor is further configured to receive, from the network entity, one or more relay service codes for relay access via the IWF.

24. The apparatus of claim 13, wherein the network entity corresponds to a 5G Core (5GC) entity and the sidelink interface corresponds to a PC5 interface, and wherein the IWF corresponds to a Non-3GPP Interworking Function (N3IWF).

* * * * *